United States Patent
Takamura et al.

(10) Patent No.: US 6,587,751 B2
(45) Date of Patent: Jul. 1, 2003

(54) ROBOT DEVICE AND METHOD FOR CONTROLLING THE ROBOT'S EMOTIONS

(75) Inventors: Seiichi Takamura, Tokyo (JP); Noriaki Sakabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/107,968

(22) Filed: Mar. 27, 2002

(65) Prior Publication Data

US 2002/0103576 A1 Aug. 1, 2002

Related U.S. Application Data

(63) Continuation of application No. 09/743,229, filed as application No. PCT/JP00/02989 on May 10, 2000, now Pat. No. 6,445,978.

(30) Foreign Application Priority Data

| May 10, 1999 | (JP) | ............................................. | 11-129276 |
| Nov. 30, 1999 | (JP) | ............................................. | 11-341210 |
| Dec. 28, 1999 | (JP) | ............................................. | 11-375548 |

(51) Int. Cl.⁷ ............................................. G06F 19/00
(52) U.S. Cl. ........................ 700/245; 700/246; 700/247; 700/248; 700/249; 700/250; 700/253; 700/257; 700/259; 700/260; 700/261; 700/262; 700/264; 700/275; 701/23; 901/1; 901/46; 901/47; 318/568.12; 318/800
(58) Field of Search .................... 700/261, 245–250, 700/253, 257, 260, 262, 264, 275, 259; 701/23; 901/1, 46, 47; 318/568.12, 800

(56) References Cited

U.S. PATENT DOCUMENTS

| 4,657,104 | A | * | 4/1987 | Holland ..................... 180/211 |
| 5,063,492 | A | | 11/1991 | Yoda et al. |
| 5,572,646 | A | | 11/1996 | Kawai et al. |
| 5,963,712 | A | * | 10/1999 | Fujita et al. ........... 318/568.12 |
| 6,038,493 | A | * | 3/2000 | Tow ............................. 700/259 |
| 6,058,385 | A | * | 5/2000 | Koza et al. .................... 706/13 |
| 6,081,750 | A | | 6/2000 | Hoffberg et al. |
| 6,249,780 | B1 | | 6/2001 | Mizokawa |
| 6,275,773 | B1 | * | 8/2001 | Lemelson et al. .......... 340/436 |
| 6,321,140 | B1 | * | 11/2001 | Fujita et al. ................. 250/253 |

FOREIGN PATENT DOCUMENTS

| CN | 1103974 A | 6/1995 |
| CN | 1175028 A | 3/1998 |
| CN | 1194877 A | 10/1998 |
| DE | 297 15 105 | 12/1997 |
| DE | 694 18 398 | 5/1999 |
| EP | 0 640 928 | 3/1995 |
| EP | 0 790 561 | 8/1997 |
| EP | 0 871 137 | 10/1998 |
| JP | 62-227394 | 10/1987 |
| JP | 07-160853 | 6/1995 |
| JP | 7-83794 | 9/1995 |
| JP | 10-274921 | 10/1998 |
| JP | 10-333542 | 12/1998 |

OTHER PUBLICATIONS

Breazeal et al., Infant–like social interactions between a robot and a human caregiver, 1998, Internet, p. 1–p. 44.*
Hara et al., Real–time facial interaction between human and 3D face robot agent, 1996, Internet/IEEE, pp. 401–409.*
Sloman et al., Architectures and tools for human–like agents, 1998, Internet, pp. 1–9.*

(List continued on next page.)

Primary Examiner—William A. Cuchlinski, Jr.
Assistant Examiner—McDieunel Marc
(74) Attorney, Agent, or Firm—Frommer Lawrence & Haug LLP; William S. Frommer; Gordon Kessler

(57) ABSTRACT

In a robot and its control method the behavior and motion models functioning as bases in generating behaviors and motions of the robot are transformed based on the input history from the outside and the history of its own behaviors and motions.

6 Claims, 31 Drawing Sheets

OTHER PUBLICATIONS

Bischoff et al., Natual communicaiton adn interaction with Humanoid robots, 1999, Internet, pp.*

"Proceedings of the Second International Conference on Autonomous Agents", Masahiro Fujita et al., May 9–13, 1998, pp. 54–61.

"The $2^{nd}$ Conference on JSME Robotics and Mechatronics Symposia", Masahiro Fujita, JSME Centennial Grand Congress, No. 97-15, pp. 19–24.

Arikawa et al., "Development of Quadruped Walking Robot Titan–VIII", 1996, IEEE, pp. 208–214.

Chevallereau et al., "Control a Walking Robot with Feet Following a Reference Trajectory Derived From Ballistic Motion", 1997, IEEE, pp. 1094–1099.

Minamisawa et al., "Leg Synchronization by Distributed Control Structure", 1996, IEEE, pp. 237–240.

* cited by examiner

| | Input Event Name | Data Name | Data Range | A | B | C | D | n |
|---|---|---|---|---|---|---|---|---|
| node 100 | | | | | | | | |
| Node to transit | | | | node 120 | node120 | node 1000 | | node 600 |
| Output behavior | | | | ACTION 1 | ACTION 2 | MOVE BACK | | ACTION 4 |
| 1 | BALL | SIZE | 0,1000 | 30% | | | | |
| 2 | PAT | | | | 40% | | | |
| 3 | HIT | | | | 20% | | | |
| 4 | MOTION | | | | | | | |
| 5 | OBSTACLE | DISTANCE | 0,100 | | | | | |
| 6 | | JOY | 50,100 | | | 50% | | |
| 7 | | SUPRISE | 50,100 | | | 100% | | |
| 8 | | SADNESS | 50,100 | | | | | |

Transition Probability to Other Nodes

「BABY」

| | | | |
|---|---|---|---|
| node 100 , | FIRST LINE , | FIRST COLUMN , | 20% |
| node 100 , | FIRST LINE , | nTH COLUMN , | 30% |
| node 320 , | 3RD LINE , | 3RD COLUMN , | 0% |
| node 720 , | SECOND LINE , | 4TH COLUMN , | 15% |

~84A

「ADULT」

| | | | |
|---|---|---|---|
| node 230 , | FIRST LINE , | 3RD COLUMN , | 40% |
| node 230 , | FIRST LINE , | 4TH COLUMN , | 0% |
| node 320 , | 4TH LINE , | 15TH COLUMN , | 20% |

~84D

NODE NAME | TRANSFORM PLACES | TRANSITION PROBABILITY AFTER TRANSFORM

FIG. 21

| | BALL-DEALING BEHAVIOR & BEHAVIOR MODEL | OBJECT DETECTION BEHAVIOR & BEHAVIOR MODEL | ... | BATTERY MANAGEMENT BEHAVIOR & BEHAVIOR MODEL |
|---|---|---|---|---|
| Baby1 | 0 | 4 | ... | 1 |
| Child1 | 2 | 1 | ... | 1 |
| Child2 | 3 | 1 | ... | 1 |
| Young2 | 4 | 2 | ... | 1 |
| Young2 | 5 | 2 | ... | 1 |
| Young3 | 6 | 3 | ... | 0 |
| Adult1 | 2 | 6 | ... | 0 |
| Adult2 | 0 | 4 | ... | 0 |
| Adult3 | 1 | 5 | ... | 0 |
| Adult4 | 0 | 4 | ... | 0 |

ROBOT DEVICE AND METHOD FOR CONTROLLING THE ROBOT'S EMOTIONS

CROSS REFERENCE TO RELATED APPLICATIONS

This is a continuation of copending U.S. patent application Ser. No. 09/743,229 filed Mar. 19, 2001 now U.S. Pat. No. 6,445,978 which is a 371 of PCT/JP00/02989 filed May 10, 2000.

TECHNICAL FIELD

The present invention relates to a robot and its control method, and is suitably applied to a pet robot.

BACKGROUND ART

Of late a 4-legged walking pet robot has been proposed and developed by this patent applicant, which acts according to the directions from a user and surroundings it is put in. Such a pet 'robot takes the shape of a dog or cat kept in an ordinary home and acts autonomously according to the directions from the user and surroundings it is put in. A set of motions is defined as 'behavior' in the following explanation.

It is imagined that if such a pet robot is provided with the function of 'growing' like a real dog or cat, the user may get a much larger sense of affinity and satisfaction out of the pet robot, thereby increasing the amusement of the pet robot.

With the pet robot provided with the 'growth' function if some more innovative contrivance is incorporated into it, that is capable of retaining the user's interest and precluding the user getting tired of the pet robot's behaviors and motions in such a case that the pet robot ceases to grow any longer or that it takes a long period of time until it resumes growing, much more amusement may be induced out of the pet robot.

DISCLOSURE OF THE INVENTION

The present invention has been made considering the foregoing and intends to offer a robot and control method for it which may increase the amusement on the part of the user.

In order to solve the subject matter, with the present invention the robot is provided with a behavior and/or motion generation means for generating behaviors and/or motions based on the behavior and/or motion models, and a behavior and/or motion model transforming means for transforming behavior and/or motion models into a higher level of behavior and/or motion models at a given timing based on at least one of the input history from the outside and the behavior and/or motion history of its own, so that the behaviors and motions are transformed as if a pet robot were 'growing'. Thus a robot can be realized, whose amusement quality (entertainingness) is greatly increased for the user.

Also, with the present invention the robot is provided with a behavior and/or motion generation means for generating behaviors and/or motions based on the behavior and motions models, and a first transforming means for transforming behaviors and/or motions into a higher level of behaviors and/or motions in order, according to a set of first given conditions, and a second transforming means for transforming behaviors and/or motion models into the same or lower level of behaviors and/or motions, according to a set of second given conditions based on at least one of the input history from the outside and behaviors and/or motions history of its own, so that the behaviors and motions of the robot are prevented from being tired of. Thus a robot can be realized, whose amusement quality (entertainingness) is further increased for the user.

Furthermore, with the present invention the robot is provided with a behavior and/or motion generation means for generating behaviors and/or motions based on the behavior and/motion models, and a behavior and/or motion transforming means for transforming behaviors and/or motions into behavior and/or motion models of a higher growth level at a given timing based on the evaluation results obtained by evaluating its own behaviors in accordance with given evaluation functions. In this manner the behaviors and motions can be transformed as if the robot were growing. Thus a robot can be realized whose amusement quality (entertainingness) is greatly increased for the user.

Furthermore, with the present invention the robot having a plurality of behavior and/or motion models for a plurality of behaviors and/or motions, is provided with a behavior and/or motion generation means for generating behaviors and/or motions based on the behavior and/or motion models of corresponding behavior patterns, and a transforming means for transforming each behavior and/or motion model of the corresponding behavior pattern, with the use of which each behavior and/or motion model of the corresponding behavior pattern can be transformed with different regulations preset for each behavior and/or motion model, so that the individuality of the robot can be diversified. Thus a robot can be realized whose amusement quality (entertainingness) is greatly enhanced.

Furthermore, with the present invention the control method for a robot comprises the first step wherein behaviors and/or motions are generated based on the behavior and/or motion models, and the second step where behavior and/or motion models are transformed into behavior and/or motions models of a higher level at a given timing based on at least one of the input history from the outside and behavior and/or motion history of its own, so that behaviors and motions can be transformed as if the robot were growing. Thus a control method can be realized, due to which the amusement quality (entertainingness) of the robot is substantially enhanced.

Furthermore, with the present invention the control method for a robot comprises the first step where behaviors and/or motions are generated based on the behavior and/or motion models, and the second step wherein behavior and/or motion models are transformed into behavior and/or motion models of a higher growth level based on the first given conditions, and wherein behavior and/or motion models are transformed into behavior and/or motion models of an equal or a lower growth level based according to second given conditions based on at least one of the input history from the outside and behavior and/or motion history of its own, so that the behaviors and motions of a robot are effectively prevented from being tired of. Thus a control method can be realized, which increases the amusement of a robot substantially.

Furthermore, with the present invention the control method for a robot comprises the first step wherein behaviors and/or motions are generated based on the behavior and motion models and the second step wherein behaviors and/or motions are transformed into behavior and motion models of a higher growth level at a given timing based on the evaluation results obtained by evaluating its own behaviors in accordance with given evaluation functions, so that the behaviors and motions are transformed as if a robot were growing. Thus the control method for a robot can be realized, whose entertainingness is substantially enhanced.

Furthermore, with the present invention the control method for a robot having a plurality of behavior and/or motion models for a plurality of behavior patterns, comprises the first step wherein behaviors and motions are generated based on each behavior and/or motion of the corresponding behavior pattern, and the second step where each behavior and/or motion model of the corresponding behavior pattern is transformed responding to the influence from the outside, and wherein each behavior and/or motion model of the corresponding behavior pattern is transformed according to a different regulation preset for each behavior and/or motion model, so that the individuality of the robot can be diversified. Thus the control method for a robot can be realized that increases the amusement quality (entertainingness) greatly.

BRIEF DESCRIPTION OF THE DRAWINGS

FIG. 7 is a conceptual table of a state transition.

FIG. 21 a conceptual diagram instrumental in describing differential files.

FIG. 35 is a conceptual diagram of a learning speed table.

BEST MODE OF CARRYING OUT THE INVENTION

Figure 1:
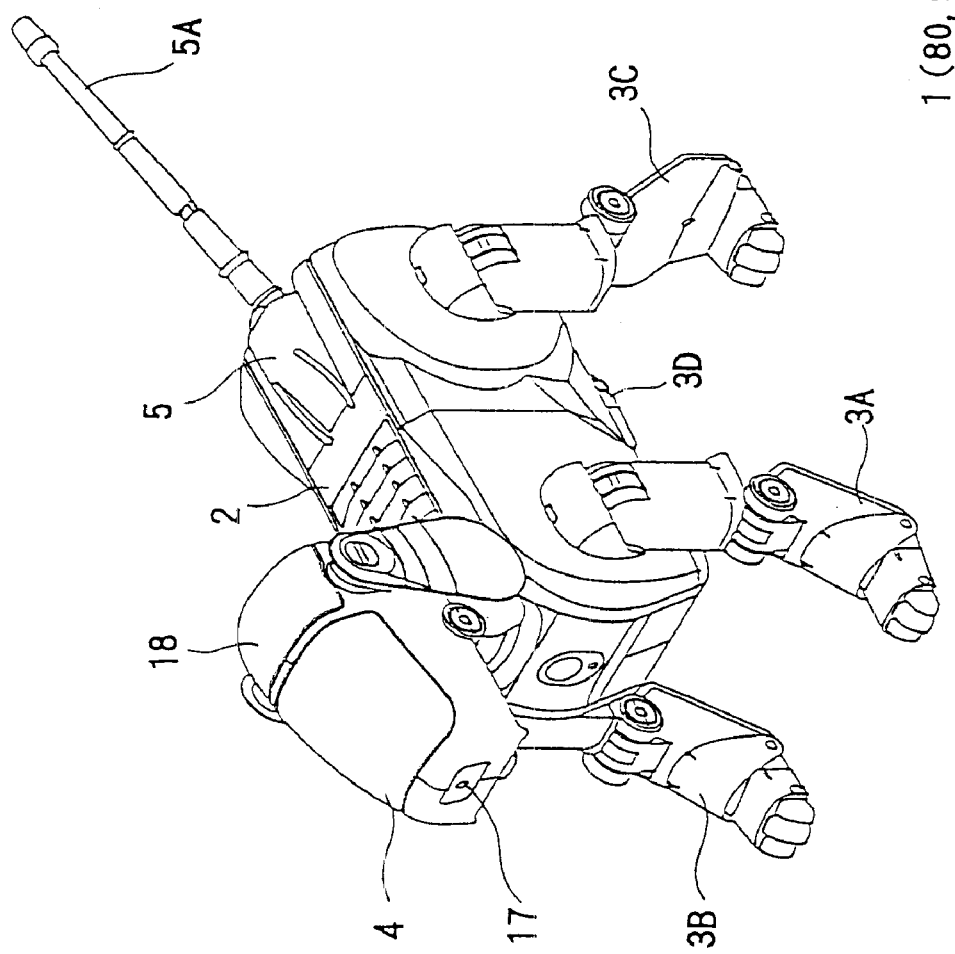
FIG. 1 is a perspective view of the external structure of a pet robot embodying the present invention.

A few preferred embodiments of the present invention are elucidated hereunder:

(1) First Embodiment (1-1) Structure of a Pet Robot in a First Mode of Carrying Out the Present Invention The [1] in FIG. 1 is a pet robot in whole in a first embodiment wherein a leg unit 3A~3D is connected to a body unit 2, one each at the left and right part of the front and rear sides, and a head unit 4 and tail unit 5 at the front and rear ends respectively.

Figure 2:
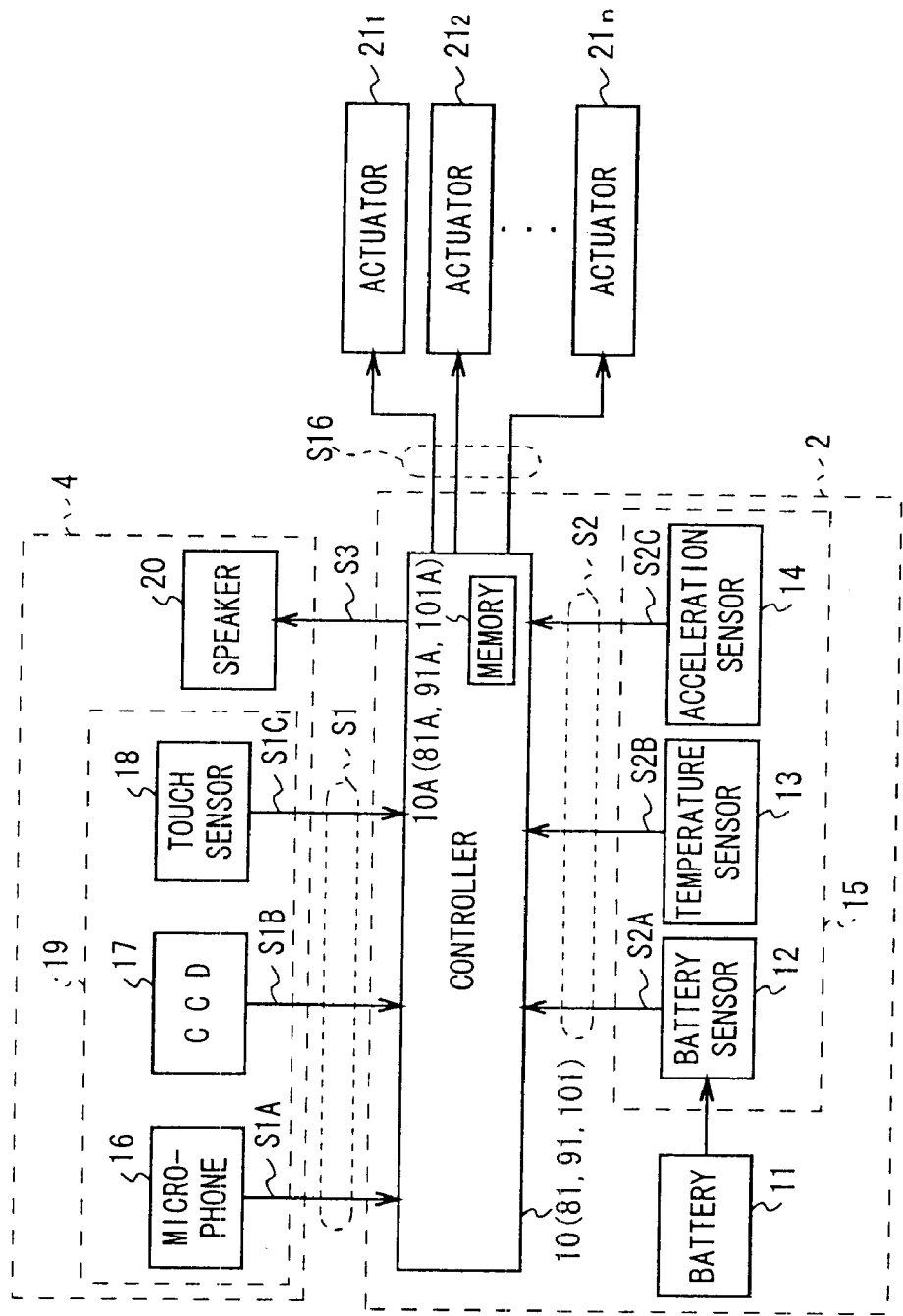
FIG. 2 is a block diagram of the circuit configuration of a pet robot.

In this case, as shown in FIG. 2, a body unit 2 houses a controller 10 controlling the overall operation of the pet robot 1, a battery 11 as power source for the pet robot 1, and an internal sensor unit 15 made up of a battery sensor 12, thermal sensor 13 and an acceleration sensor 14.

Also, placed at the designated positions on the head unit 4 are an external sensor unit 19 made up of a microphone 14 for the 'ear' of the pet robot 1, CCD camera 17 (Charge Coupled Device) for the 'eye' and a touch sensor 18, and a speaker for the 'mouth' respectively.

An actuator $21_1$~$21_n$ is placed at the joint of each leg unit 3A~3D, at the linkage point of each leg unit 3A~3D and the body unit 2, at the linkage point of the head unit 4 and body unit 2 as well as at the linkage point of the tail unit 5 and body unit 2.

The microphone of the external sensor unit 19 collects command sounds given in terms of a scale through a sound commander (not shown in figure), such as 'Walk', 'Lie down', or 'Chase the ball', a resultant voice signal S1A of which is fed to the controller 10. The CCD camera takes a picture of the surroundings, an image signal S1B obtained from which is sent to the controller 10.

The touch sensor 18 located at the upper part of the head unit 4, as is apparent from FIG. 1, detects a pressure received, which is created as a result of a physical influence such as 'Stroke' or 'Pat' exerted by the user, and the detected result is fed to the controller as a pressure detection signal S1C.

The battery sensor 12 of the internal sensor unit 15 detects the residual energy of the battery 11, of which result is sent to the controller 10 as a battery residue detection signal S2A. The thermal sensor 13 detects a temperature inside the pet robot 1 whose result is sent to the controller 10 as a temperature detection signal S2B. The acceleration sensor 14 detects acceleration in the direction of 3 axes (X, Y and Z) whose result is transferred to the controller 10 as an acceleration detection signal S2C. The controller 10 judges external and internal states and the existence of a command or influence from the user based on the voice signal S1A given from the external sensor 19, image sensor S1B and pressure detection signal S1C (these two are put together and called external information signal S1 hereinafter), the battery residue detection signal S2A supplied by the internal sensor unit 15, temperature detection signal S2 B and acceleration detection signal S2C, etc. (they are put together and called internal information signal S2 hereinafter).

The controller 10 determines the next behavior based on the foregoing judgment result and a control program stored beforehand in the memory 10A, and drives the actuator $21_1$~$21_n$ based on the result obtained so as to let the pet robot 1 perform behaviors and motions such as swinging the head unit 4 up and down, left and right, moving the tail 5A of the tail unit 5 and walking by driving the leg unit 3A~3D.

At the same time, the controller 10 generates a voice signal S3 as required, which is fed to the speaker 20 to output a voice outside based on the voice signal S3 and blink an LED (Light Emitting Diode, not shown in figure) placed at the position where the eyes of the pet robot 1 are supposed to be.

In this way the pet robot 1 is designed to be capable of acting autonomously responding to a state inside and outside of it and commands and influence from the user. In addition to the foregoing operations, the pet robot 1 is also designed to transform its behaviors and motions as if it were 'growing' like a real animal, according to the history of input operations such as influence and sound commands exerted by the user and the history of its own behaviors and motions.

Figure 3:
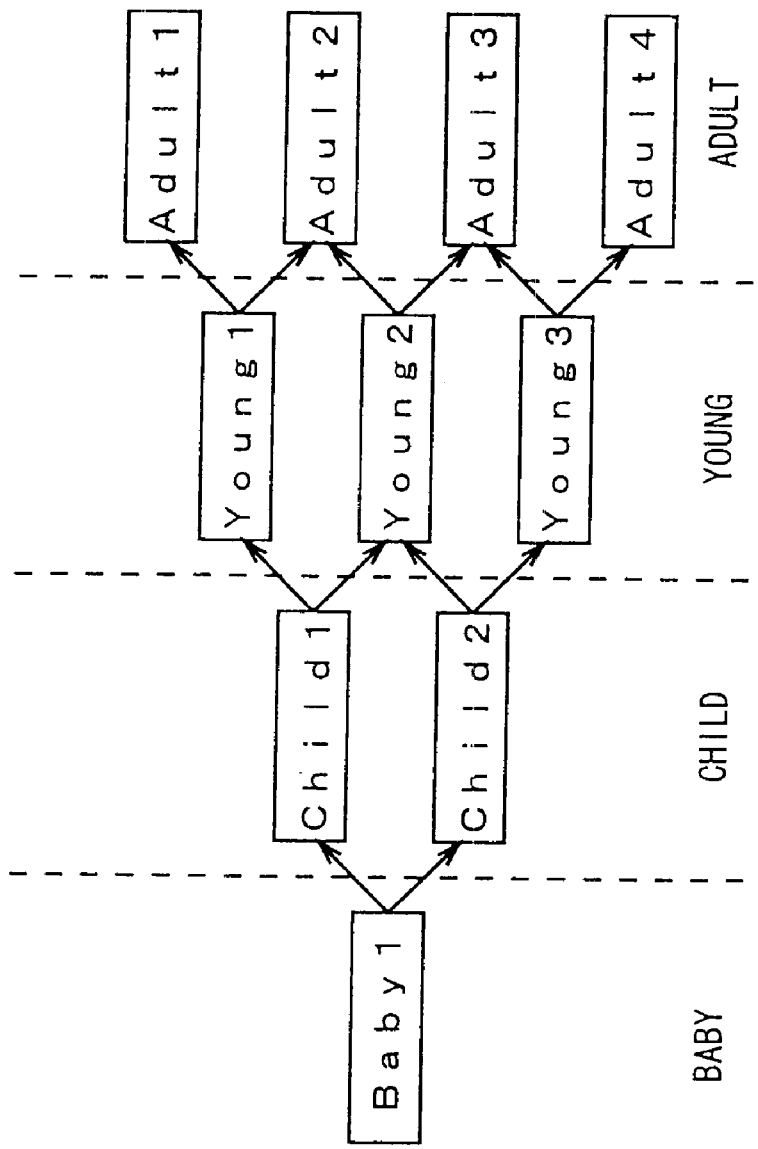
FIG. 3 is a conceptual chart of growth models.

That is to say, the pet robot 1 comprises, as understood from FIG. 3, the four stages of 'Baby', 'Child', 'Young' and 'Adult' as a growth process. Stored beforehand in the memory 10A of the controller 10 are behavior and motion models composed of various control parameters and control programs, which form the bases for behaviors and motions relating to four items: 'walking state', 'motion', 'behavior' and '(barking) sound' for each 'growth stage'.

The controller 10 then controls each actuator $21_1$~$21_n$ and voice output such that, in accordance with the behavior and motion models of 'Baby' in the initial stage, as to the 'walking state' for example, the pet robot 1 toddles with narrower walking steps, shorter walking periods and lower leg movements, and as to the 'motions', the pet robot 1 conducts just such 'monotonous' actions as 'walk', 'stand', and 'lie down', and as to the behaviors, the pet robot 1 performs just 'monotonous' behaviors, repeating similar ones, and as to the 'sounds', the pet robot 1 barks in a small and short voice by lowering the amplification of the voice signal S3.

Simultaneously the controller 10 watches for and counts the number of occurrences in respect to a plurality of elements (referred to as 'growth elements' hereinafter) contributing to the predetermined 'growth', such as command inputs by means of sound commands, reinforced learning made up of command inputs corresponding to 'stroke' and 'pat' entered with the use of the sound commands and the number of successes in conducting predetermined behaviors and motions, sensor inputs not corresponding to 'stroke' and 'pat' entered through the touch sensor 18, predetermined behaviors and motions such as 'play with the ball, and other elements.

The controller 10 transforms behavior and motion models to be used, from the behavior and motions models for 'Child' into a higher set of behavior and motion models for 'Young' based on the accumulated sum of frequencies of those growth elements when the total value of accumulated sum of frequencies of each growth element (this is referred to as 'integrated experience value of the growth elements' hereinafter) exceeds a preset threshold.

The controller 10 then controls each actuator $21_1$~$21_n$ and a voice output from the speaker 20 in accordance with the behavior and motion models for 'Child', such that the pet robot 1, as to the 'walking state', walks a bit more firmly with each actuator $21_1$~$21_n$ rotated faster, longer periods of time and the legs raised higher, as to 'motion', moves with 'a bit more enhanced and intricate' movements by increasing the number of motions, as to 'behavior', behaves with 'a bit of objectiveness' by determining the next behavior referring to the previous one, and as to 'sound', barks in 'a bit longer and louder voice' by prolonging and amplifying the length of a voice signal.

Furthermore, the controller 10 transforms, in a similar manner, the behavior and motion models in order into behavior and motion models of a higher growth level for 'Young' or 'Adult' whenever the integrated experience value of the growth elements exceeds each threshold preset for 'Young' or 'Adult'. Simultaneously the rotation speed of each actuator $21_1$~$21_n$ is varied according to the corresponding behavior and motion models so as to have the walking periods prolonged, the legs raised higher, or to increase gradually the length and amplification of the voice signal S3 fed to the speaker 20. That is, the number of rotation of the actuator $21_1$~$21_n$ is varied for each behavior or motion.

Consequently, as a growth stage rises (from 'Baby' to 'Child', from 'Child' to 'Young', from 'Young' to 'Adult'), the 'walking state' of the pet robot 1 transforms from 'toddle' to 'walk more firmly', the 'motion' from 'monotonous' to 'enhanced, intricate', and 'behavior' from 'monotonous' to 'behave with objectiveness', and the 'sound' varies from 'small and short' to 'longer and louder' by stages.

In this manner the pet robot 1 is designed to grow in four stages, namely 'Baby', 'Child', 'Young' and 'Adult', according to the inputs from the outside and the history of the behaviors and motions of its own.

In the case of this embodiment, a plurality of behavior and motion models are, as is apparent from FIG. 3, prepared for each 'growth stage' of 'Baby', 'Child', 'Young' and 'Adult'.

In practice, for example, as behavior and motion models for 'Child', the behavior and motion models (Child 1) are prepared based on which the behaviors and motions of particular behavior patterns are conducted to represent quick but rough 'wild' movements, and another set of behavior and motion models (Child 2) based on which the behaviors and motions of particular behavior patterns to represent smooth and slow 'calm' movements.

For the 'Young' behavior and motion models, three sets of behavior and motion models are prepared; Young 1: behaviors and motion models for conducting behaviors and motions of much quicker and rougher 'irritating' movements compared to the 'wild' behavior patterns for 'Child', Young 2: behavior and motion models for conducting behaviors and motions of slower and smoother moving 'normal' behavior patterns, Young 3: behavior and motion models for conducting behaviors and motions of much slower moving 'calm' behavior patterns with a less amount of active movements.

Provided furthermore as behavior and motion models for 'Adult' are; Adult 1: behavior and motion models (Adult 1) for conducting behaviors and motions of 'aggressive' behavior patterns with a quality of rougher and quicker movements, performing motions not conforming to the commands from the user, Adult 2: behavior and motion models for conducting 'a bit wilder' behavior patterns with a quality of smoother and slower movements, performing motions conforming to the commands from the user, Adult 3: the behavior and motion models for conducting behaviors and motions of 'a bit calmer' behavior patterns with a quality of smoother and slower movements with a small quantity of motions, always performing motions conforming to the commands from the user, and Adult 4: behavior and motion models for conducting behavior and motions of 'calm' behavior patterns with a quality of much slower movements with a less amount of motions, always performing motions conforming to the commands from the user.

The controller 10 is designed such that in raising a 'growth stage', one of the behavior and motion models is selected from among the behavior and motion models in the next 'growth stage' based on the accumulated sum of frequencies of each growth element, and that the selected behavior and motion model is used for the next motion in place of the behavior and motion model previously used.

In this case, in transiting to the next 'growth stage' after the 'Child', the behavior and motion models of the current 'growth stage' can transit only to the predetermined behavior and motion models of the next 'growth stage', i.e. just among the behavior and motion models connected with the arrows as shown in FIG. 3. Accordingly, if the behavior and motion model 'Child 1' for conducting 'wild' behaviors and motions is selected for 'Child', for example, the pet robot 1 is not allowed to transit to the behavior and motion model 'Young 3' for 'Young', which performs 'calm' behaviors and motions.

In this manner the pet robot 1 is designed such that its 'behavior patterns' transform as it grows according to the input history of influence and commands from the user and the history of behaviors and motions of its own.

(1-2) Processing of Controller 10

Concrete processing of the controller 10 of the pet robot 1 is described hereunder.

Figure 4:
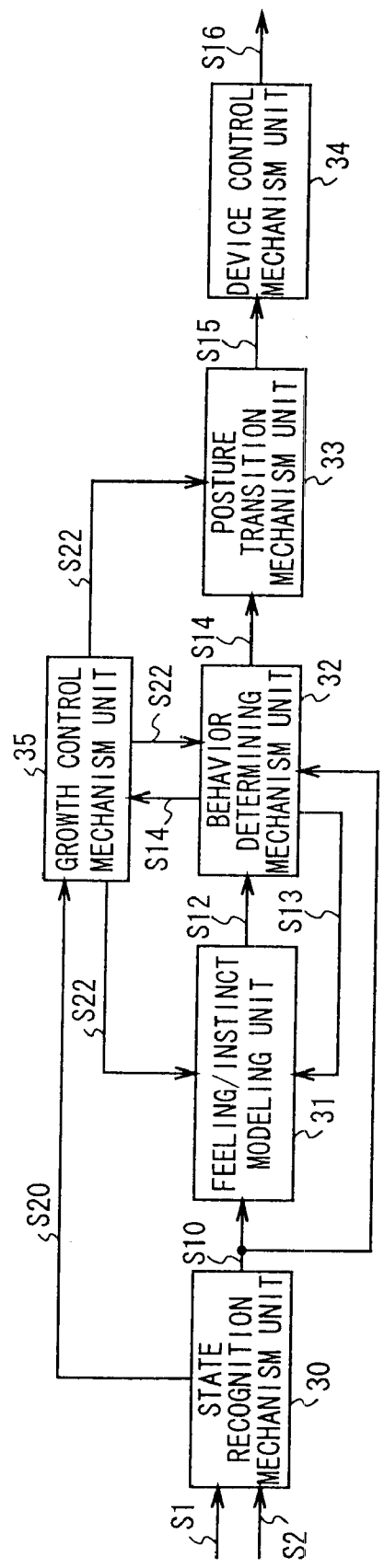
FIG. 4 is block diagram instrumental in describing the processes of a controller.

The contents of the processing of the controller 10 are functionally divided as follows, as shown in FIG. 4:

state recognition mechanism unit 30 for recognizing external and internal circumstances feeling/instinct modeling unit 31 for determining the state of feeling and instinct based on the results recognized by the state recognition mechanism unit 30 behavior determining mechanism unit 32 for determining the next behavior or motion based on the result recognized by the state recognition mechanism unit 30 and the output by the feeling/instinct modeling unit 31 posture transition mechanism unit 33 for making a plan for a series of motions based on which the pet robot 1 performs behaviors and motions determined by the behavior determining mechanism unit 32 device control mechanism unit 34 for controlling the actuator $21_1$~$21_n$ based on the plan made by the posture transition mechanism unit 33, and growth control mechanism unit 35 for controlling 'growth'.

Elucidation is given on the state recognition mechanism unit 30, feeling/instinct modeling unit 31, behavior determining mechanism unit 32, posture transition mechanism unit 33, device control mechanism unit 34, and growth control mechanism unit 35 following.

(1-2-1) Configuration of State Recognition Mechanism Unit 30

The state recognition mechanism unit 30 recognizes a particular state based on the external information signal S1 and internal information signal S2, the result of which is conveyed to the feeling/instinct modeling unit 31 and behavior determining mechanism unit 32.

In practice the state recognition mechanism unit 30 constantly watches for a voice signal S1A given from the microphone 16 of the external sensor unit 19 and recognizes that a command is given when a spectrum of the same scale is detected as the command sound outputted from the sound commander, according to a command such as 'walk', 'lie down' or 'chase the ball' given as the spectrum of the voice signal S1A, the result of which is conveyed to the feeling/instinct modeling unit 31 and behavior determining mechanism unit 32.

The state recognition mechanism unit 30 also constantly watches for the image signal S1B given from the CCD camera 17 (FIG. 2) and recognizes, for example, a state 'there is a ball' or 'there is a wall' if it detects a 'red, round ball' or a 'plane perpendicular to and higher than the ground' within the image based on the image signal S1B, the result of which is conveyed to the feeling/instinct modeling unit 31 and behavior determining mechanism unit 32.

Furthermore the state recognition mechanism unit 30 constantly watches for a pressure detection signal S1C given from the touch sensor 18 (FIG. 2) and recognizes a state 'patted (scolded)' when a pressure is detected which is larger than a given threshold based-on the pressure detection signal S1C for a short period of time (e.g. less than 2 seconds), and a state 'stroked (praised) when a pressure is detected which is less than a given threshold for a long period of time (e.g. longer than 2 seconds), the result of which is conveyed to the feeling/instinct modeling unit 31 and behavior determining mechanism unit 32.

The state recognition mechanism unit 30 also constantly watches for an acceleration detection signal S2C given from the acceleration sensor 14 (FIG. 2) of the internal sensor unit 15 and recognizes a state 'received a big impact when an acceleration is detected which is larger than e.g. that of a preset given level based on the acceleration signal S2C, while it recognizes a state 'fell (from the table, etc.)' when an acceleration is detected which is about the gravity acceleration larger than the former, the result of which is conveyed to the feeling/instinct modeling unit 31 and behavior determining mechanism unit 32.

Also, the state recognition mechanism unit 30 constantly watches for a temperature detection signal S2B given from the temperature sensor 13 (FIG. 2) and recognizes a state 'the internal temperature has risen when a temperature is detected which is larger than a given value based on the temperature detection signal S2B, the result of which is conveyed to the feeling/instinct modeling unit 31 and behavior determining mechanism unit 32.

(1-2-2) Processing of Feeling/Instinct Modeling Unit 31

Figure 5:
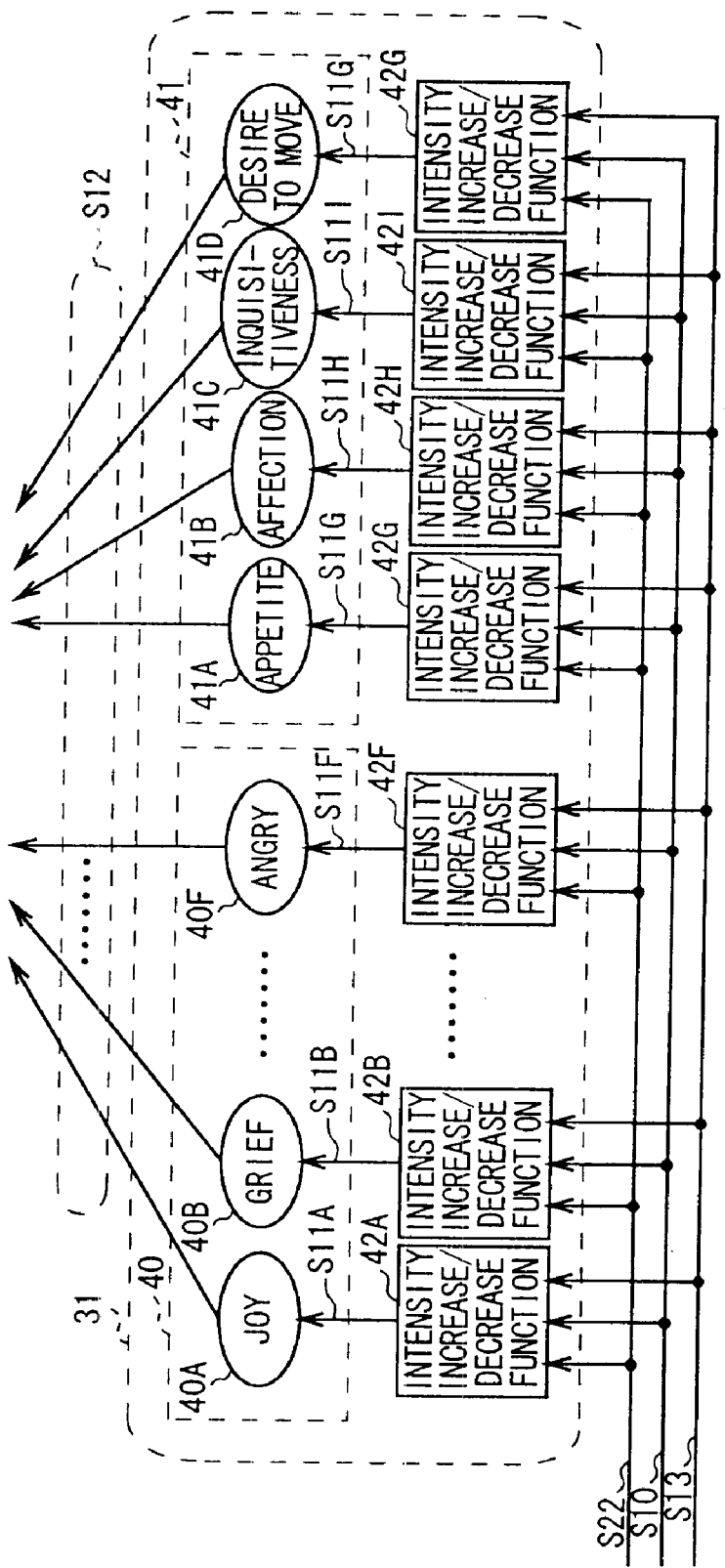
FIG. 5 is a conceptual diagram instrumental in describing a data processing in a feeling/instinct modeling unit.

The feeling/instinct modeling unit 31 comprises, as shown in FIG. 5, a basic feeling/motion group 40 consisting of feeling models corresponding to each of six (6) feelings or motions: 'joy', 'grief', 'surprise', 'fear', 'dislike', and 'anger, and a basic desire group 41 consisting of desire units 41A~41D provided as desire models corresponding to each of four (4) desires: 'appetite, 'desire for affection', 'inquisitiveness', and 'desire to move', and intensity increase/decrease functions 42A~42H provided corresponding to each of the feeling/motion units 40A~40F and desire units 41A~41D.

Each of the feeling/motion units 40A~40F indicates the intensity of a corresponding feeling or motion in terms of e.g. levels from 0 to 100, which constantly varies based on the intensity information S11A~S11F given from the intensity increase/decrease functions 42A~42H, corresponding to the current intensity.

Each of the desire units 41A~41D indicates, as the feeling/motion unit 40A~40F does, the intensity of the corresponding desire in terms of levels from 0 to 100, which constantly varies based on the intensity information S12G~S12F given from intensity increase/decrease function 42G~42K, corresponding to the current intensity.

The feeling/instinct modeling unit 31 determines a state of feeling by combining the intensities of the feeling/motion units 40A~40F and a state of instinct by combining the intensities of the desire units 41A~41D. The state of feeling and instinct is outputted as feeling/instinct state information S12 at the behavior determining mechanism unit 32.

The intensity increase/decrease functions 42A~42G are the functions for generating and outputting intensity information S11A~S11G for increasing or decreasing the intensity of each of the feeling/motion units 40A~40F and desire units 41A~41D according to the preset parameters as described above, based on the state recognition information S10 given from the state recognition mechanism unit 31 and behavior information S13 indicating the contents of the present or past behaviors of the pet robot 1 itself.

Thus the characteristics such as 'irritation' or 'calmness' are put into the pet robot 1 by setting different values to the parameters of the intensity increase/decrease functions 42A~42G for each behavior and motion model (Baby 1, Child 1, Child 2, Young 1~Young 3, Adult 1~Adult 4).

(1-2-3) Processing of Behavior Determining Mechanism Unit 32

The behavior determining mechanism unit 32 has a plurality of behavior models inside the memory 10A, each corresponding to each of behavior and motion model (Baby 1, Child 1, Child 2, Young 1~Young 3, Adult 1~Adult 4).

And, the behavior determining mechanism unit 32 determines the next behavior or motion based on the state recognition information 10 given from the state recognition mechanism unit 30, the intensity of each of the feeling/motion unit 40A~40F and desire unit 41A~41D of the feeling/instinct modeling unit 31, and the corresponding behavior model, the result of which is outputted as determined behavior information 14 at the posture transition mechanism unit 33 and growth control mechanism unit 35.

Figure 6:
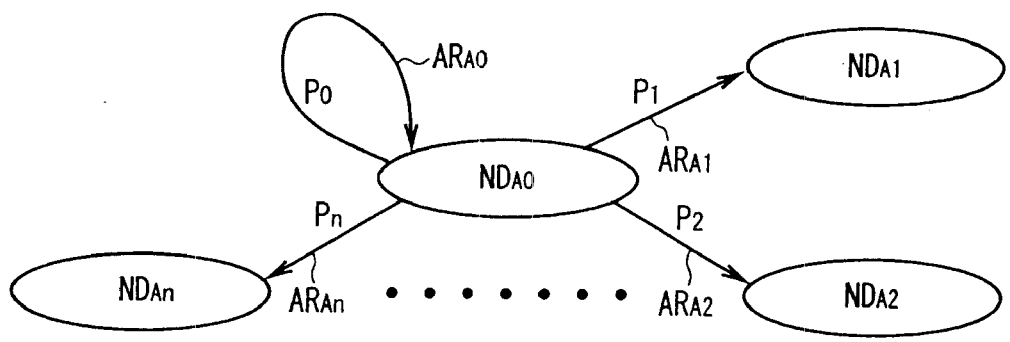
FIG. 6 is a conceptual diagram of probability automaton.

In this instance the behavior determining mechanism unit 32 uses an algorithm called probability automaton, as a means for determining the next behavior or motion, in determining with probability, to which node $ND_{A0}$~$ND_{An}$ a particular node (state) $ND_{A0}$ as shown in FIG. 6, should transit including itself based on the transition probability $P_0$~$P_n$, each set to an arc $AR_{A0}$~$AR_{An}$ connecting the nodes $ND_{A0}$~$ND_{An}$.

More concretely the memory 10A stores a state transition table 50 as shown in FIG. 7, as behavior models, for each node $ND_{A0}$~$ND_{An}$ and the behavior determining mechanism unit 32 determines the next behavior or motion based on this state transition table 50.

In the state transition table 50 the input events (recognition results) are enumerated on the 'Input Event' line with priority, which are transition conditions in the node $ND_{A0}$~$ND_{An}$, and further conditions regarding the transition conditions are described on the columns corresponding to the 'Data Name' and 'Data Range' lines.

Accordingly, in the node $ND_{100}$ defined on the state transition table 50 in FIG. 7, given a recognition result 'detected a ball (BALL)', this recognition itself and an event given at the same time that the 'size' of the ball given is within the range of 'from 0 to 1000 (0, 1000)' is the condition for the current node $ND_{100}$ to transit to another one. Likewise, given a recognition result 'detected an obstacle (OBSTACLE), this recognition result itself and an event given at the same time that the 'distance (DISTANCE)' to the obstacle is within the range of 'from 0 to 100 (0, 100) is the condition for the current node $ND_{100}$ to transit to another node.

Also, if there is no recognition result inputted into the node $ND_{100}$, it can transit to another node if, of the intensities of the feeling/motion units 40A~40F and desire units 41A~41D of the feeling/instinct modeling unit 31 referred periodically by the behavior determining mechanism unit 32, the intensity of the feeling/motion unit 40A~40F of any of 'joy (JOY), 'surprise (SURPRISE) or 'sadness (SADNESS)' is 'within the range of from 50 to 100 (50, 100).

As to the state transition table 50, the names of nodes to which the node is allowed to transit are enumerated on the row of 'Nodes to which the current node can transit' in the column of the 'transition probability to other nodes' as well as the transition probability on the line of the 'Output Actions' in the column of the 'Transition Probability to other Nodes', which lets the current node transit to any of the other nodes, when all the conditions listed on each line of the 'Name of Input Events', 'Data Value' and 'Range of Data' are satisfied. The sum of the transition probabilities on each line in the column of the 'Transition Probability to Other Nodes' is 100 [%].

Accordingly, in this case, given the recognition results, for example, that 'the ball has been detected (BALL) and that the 'SIZE' of the ball is within the range of from 0 to 1000 (0, 1000), the node can transit from the $NODE_{100}$ to the '$NODE_{120}$' (node 120) with a probability of '30 [%]', and the behaviors and motions of the 'ACTION 1' are outputted at this time.

Each of the behavior models are made up of a number of nodes of the same nodes connected, described in the state transition table 50.

In this way the behavior determining mechanism unit 32 determines with probability the next behavior or motion (a behavior or motion described on the line [Output Behaviors] using the state transition table 50 of the corresponding node of the suitable behavior models stored in the memory 10A at such a time as when state recognition information 10 is given from the state recognition mechanism unit 30 or when a given period of time has elapsed since the last behavior was discovered, the result of which is outputted as behavior command information S14 at the posture transition mechanism 33 and growth control mechanism 35.

(1-2-4) Processing of Posture Transition Mechanism Unit 33

Given behavior command information 14 from the behavior determining mechanism unit 32, the posture transition mechanism unit 33 makes a plan for a series of behaviors for the pet robot 1 to perform behaviors or motions based on the determined behavior information 14 and outputs behavior command information S15 based on the behavior plan at the control mechanism unit 34.

Figure 8:
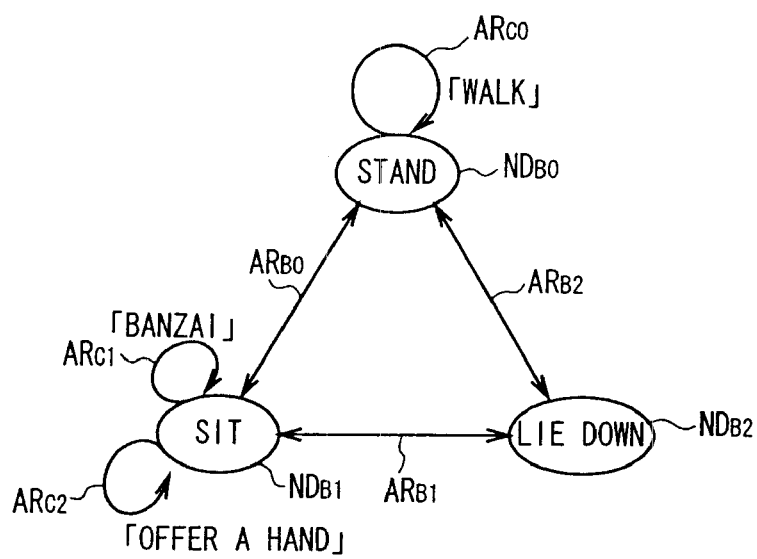
FIG. 8 is a conceptual diagram instrumental in describing a directed graph.

In this case the posture transition mechanism unit 33 uses, as a means of making an action plan, a directed graph representing a posture the pet robot 1 may take, as shown in FIG. 8, as node $ND_{B0}$~NDB2, of which nodes that can transit to one another are connected by a directed arc $AR_{B0}$~$AR_{B2}$ expressing behaviors, and representing a behavior terminating at one node among the nodes $ND_{B0}$~$ND_{B2}$ as self-acting arc $AR_{C0}$~$AR_{C2}$.

For this purpose the memory 10A stores data of files in the form of data base containing a starting posture and an ending posture of all the behaviors (these files are called 'network definition files' hereinafter) the pet robot 1 can take, which is the source of the directed graph, and the posture transition mechanism unit 33 creates a directed graph 60~63 (as shown in FIG. 9~12) for each of the whole body, head, legs and tail based on the network definition files.

As is apparent from FIG. 9~12, the postures the pet robot 1 may take are largely divided into the four (4) groups: [stand (o Standing)], [sit (o Sitting)], [Lie down (o Sleeping)], and [station (o Station)] which is the posture taken on the charger cradle (not shown in figure) to have the battery 11 (FIG. 2) charged. Each group of postures has base postures (marked ⊚) used in common for all the 'growth stages' and one or a plurality of normal postures (marked o) for 'Baby', 'Child', 'Young', and 'Adult'.

Figure 9:
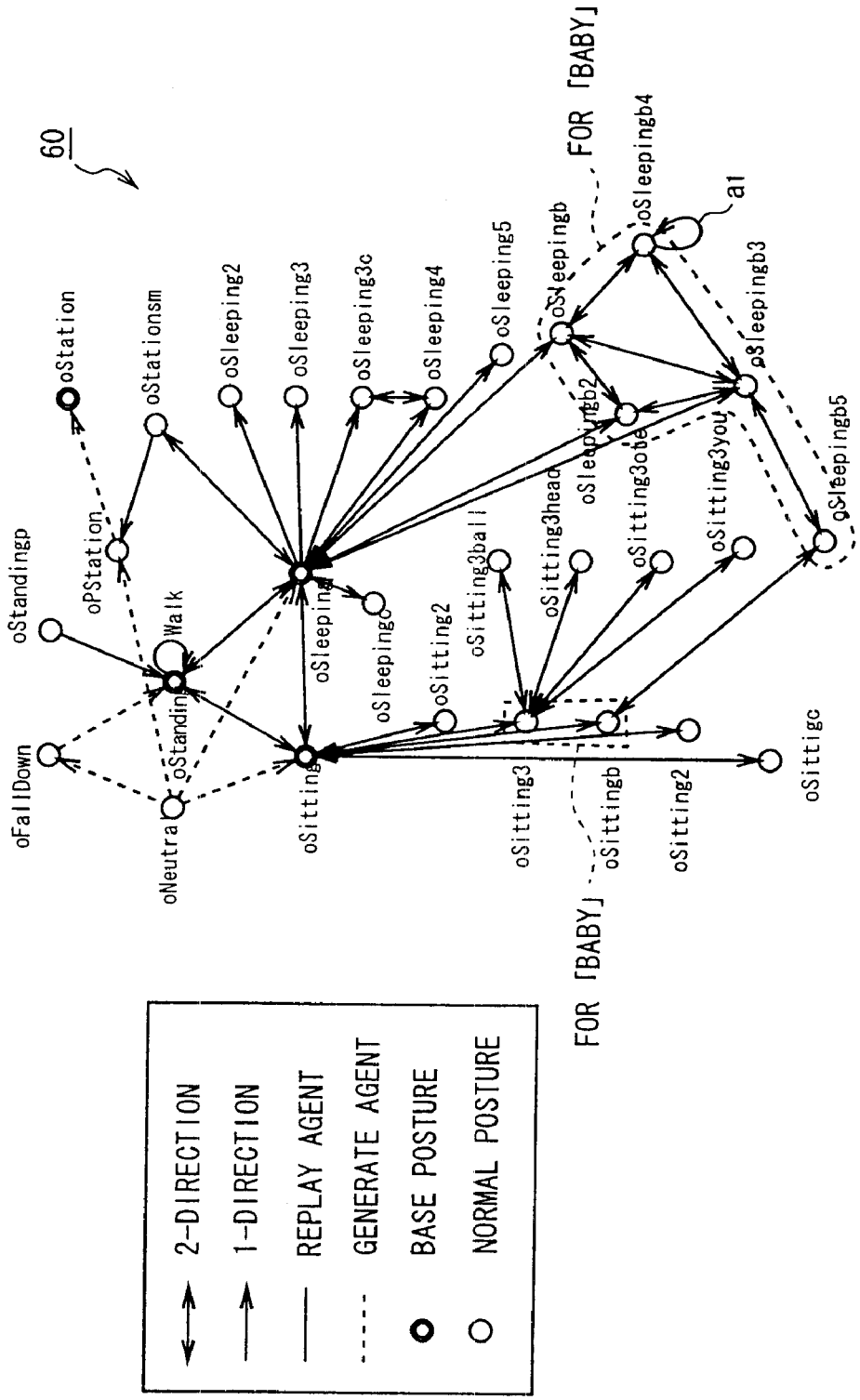
FIG. 9 is a conceptual diagram of the directed graph for the whole body.
Figure 10:
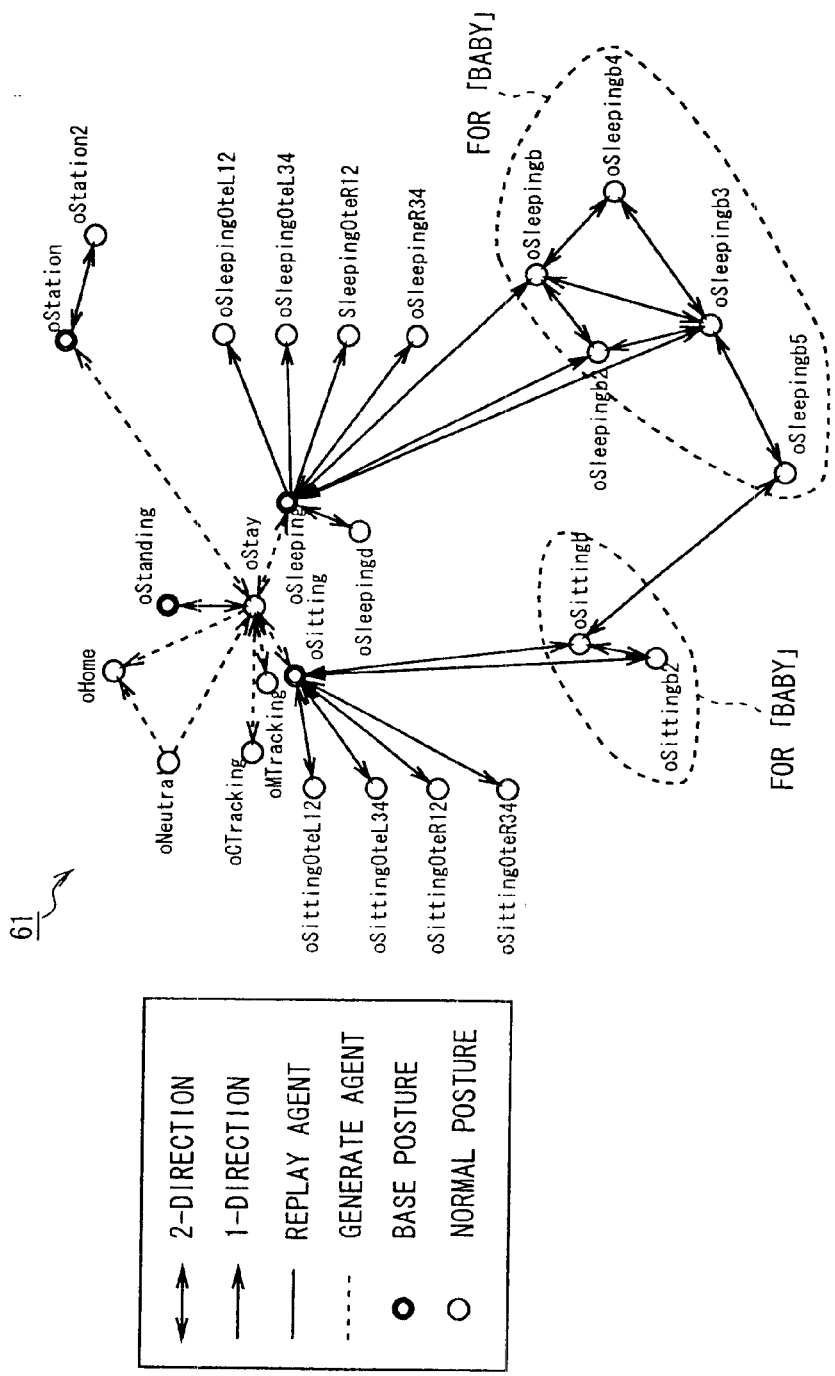
FIG. 10 a conceptual diagram of a directed graph for the head.
Figure 11:
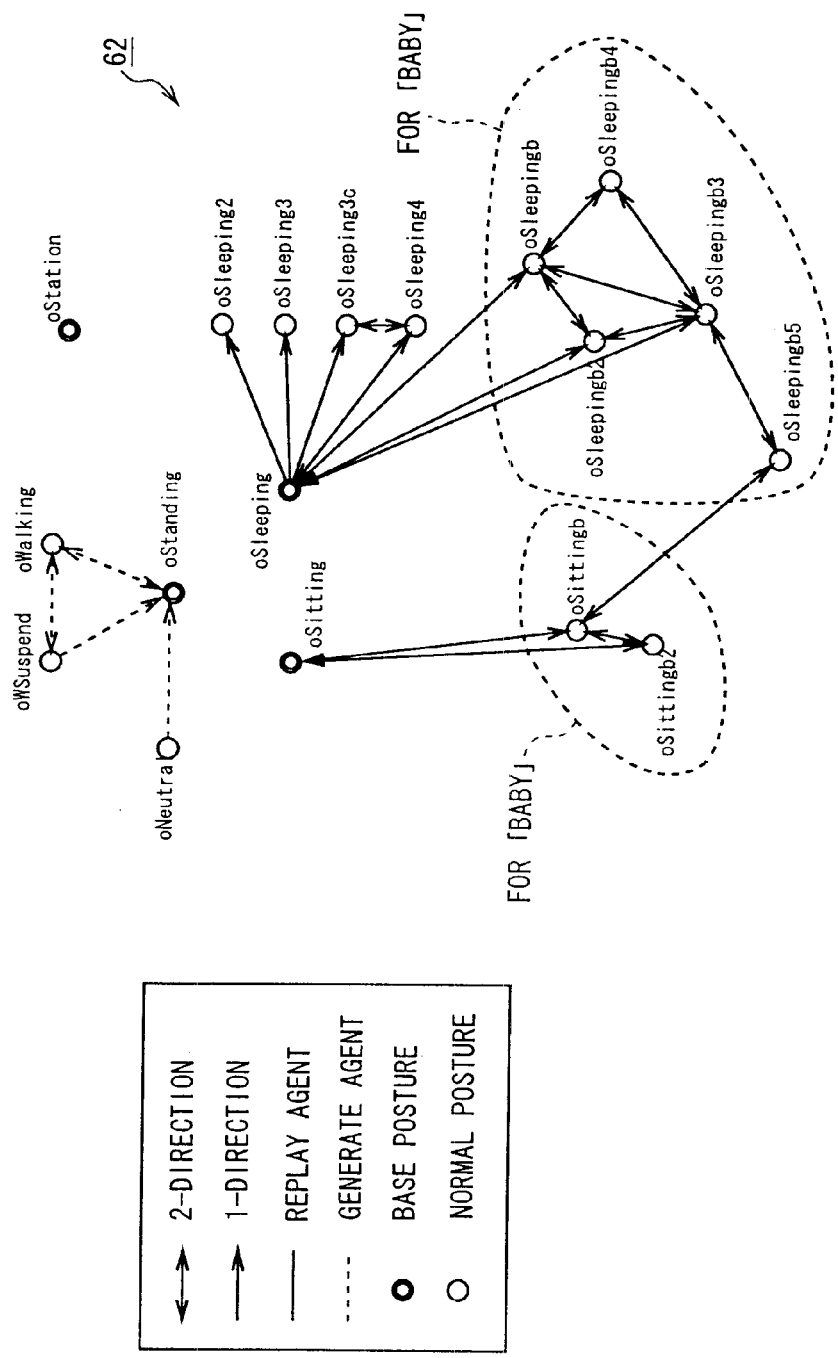
FIG. 11 is a conceptual diagram of a directed graph for the legs.
Figure 12:
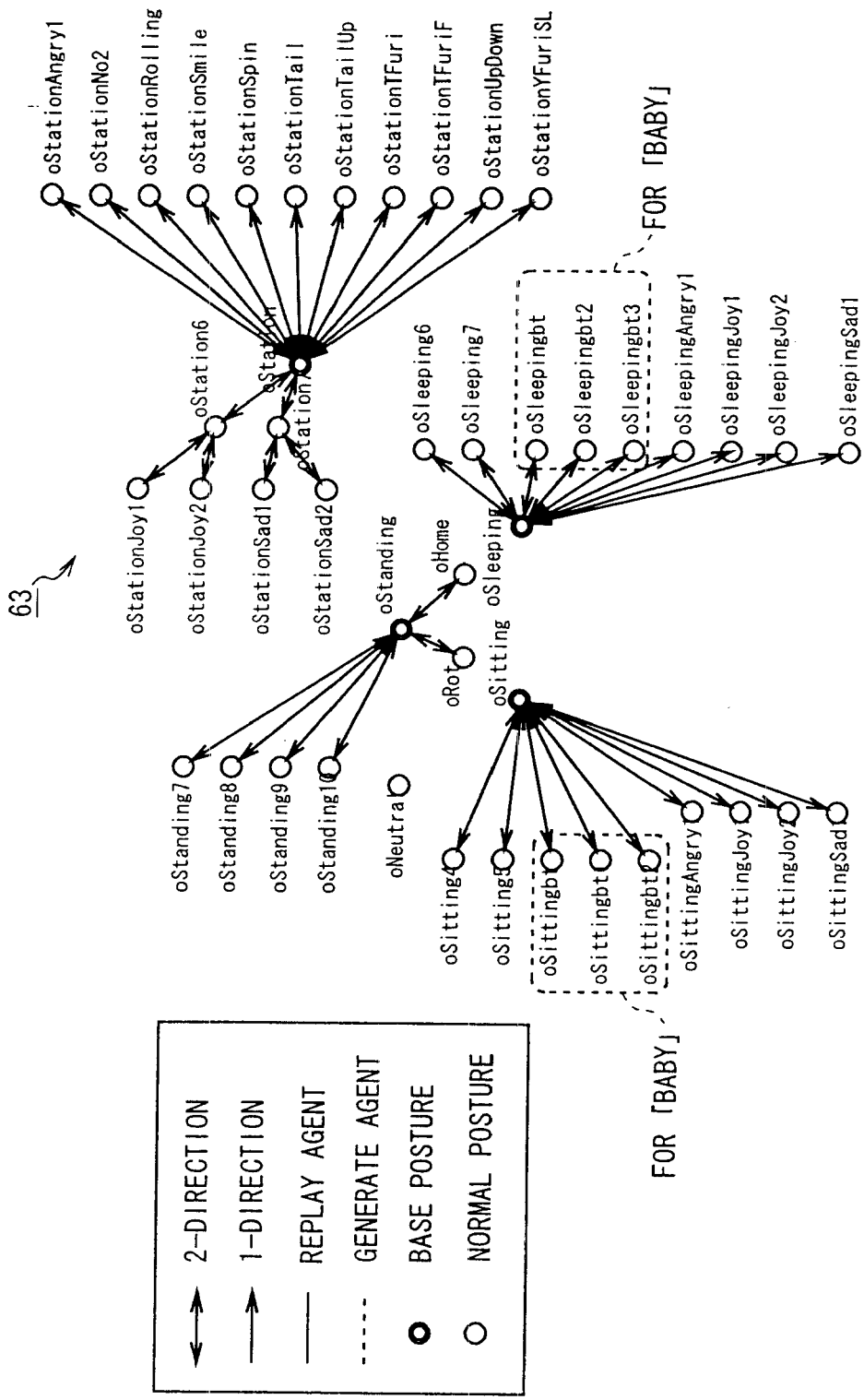
FIG. 12 is a conceptual diagram of a directed graph for the tail.

For example, the portions enclosed by the broken lines in FIG. 9~12 represent normal postures for 'Baby', and, as can be known from FIG. 9, there are prepared [o Sleeping b (baby)], [o Sleeping b2]~[o Sleeping b5] as normal postures of [lie down] for 'Child', and [o Sitting b] and [o Sitting b2] as normal postures of [sit].

And, the posture transition mechanism unit 33, given behavior command information S14 from the behavior determining mechanism unit 32, such as 'Stand up', 'Walk', 'Offer a hand', 'Swing the head' or 'Wag the tail', the posture transition mechanism unit 33, with the use of the corresponding directed graph 60~63 and following the direction of a directed arc, searches for the route to a node to which a posture designated by the current node corresponds, or a directed arc or self-acting arc to which an appointed behavior corresponds. Then behavior commands are outputted as behavior command information S15 at the device control mechanism unit 34, based on which the pet robot 1 performs behaviors in order, corresponding to each directed arc on the route obtained.

For example, if the pet robot 1 is in the state of [o Sitting b] and when a behavior command to perform a behavior present at the node [o Sleeping b4] (behavior corresponding to a self-acting arc$_{a1}$) is given to the posture transition mechanism unit 33 from the behavior determining mechanism unit 32, the posture transition mechanism unit 33 searches for a route to the node [o Sleeping b4] from the node [o Sitting b] on the directed graph 60 for the whole body, and then outputs behavior commands in order as behavior command information 15 at the control mechanism unit 34 to transit the current posture from the node [o Sitting b] to the node [o Sleeping b5], from the node [o Sleeping b5] to the node [o Sleeping b3], and from the node [o Sleeping b3] to the node [o Sleeping b4], and finally a behavior command as behavior command information S15 at the control mechanism unit 34 to return to the node [o Sleeping b4] through the self-acting arcs oriented to a behavior designated by the node [o Sleeping b4].

There may be a case at this stage that two nodes to which the current node may transit are connected with a plurality of directed arcs to transform a behavior ('wild behavior, 'calm' behavior, etc.) according to the [growth stage] and [behavior patterns] of the pet robot 1. In this case the posture transition mechanism unit 33 selects a directed arc as a route corresponding to the [growth stage] and [behavior patterns] where and which the pet robot 1 is and has acquired at and by that time, under the control of the growth control mechanism unit 35 (to be described later).

Similarly there may be a case that a plurality of self-acting arcs are provided to return to the corresponding node from a certain node to transform a motion according to a [growth stage] and [behavior pattern]. In this case, too, the posture transition mechanism unit 33 selects a directed arc as a route corresponding to the [growth stage] and [behavior patterns] where and which the pet robot 1 is and has acquired at and by that time.

During a posture transition described above the period of time for it to remain on the way is almost '0', so that the transition may be done via a node used for another [growth stage] during the posture transition.

Consequently the posture transition mechanism unit 33 searches for the shortest route to the next node, or directed arc or self-acting arc from the current node, regardless of the current [growth stage].

In a case that a behavior command is given to the head unit, leg units or tail unit, the posture transition mechanism unit 33 returns a posture of the pet robot 1 to any of the base postures (marked ⊚) based on the directed graph 60 for the whole body, and then outputs behavior command information S15 to let the posture of the head unit, leg units, or tail units transit, using the directed graph 61~63 corresponding to the head unit, let units, or tail unit.

(1-2-5) Processing of Device Control Mechanism Unit 34

The control mechanism unit 34 generates a control signal S16 based on behavior command information S15 given from the posture transition mechanism unit 33, and lets the pet robot 1 perform an appointed behavior and motion by driving each actuator $21_1$~$21_n$ based on the control signal S16.

(1-2-6) Processing of Growth Control Mechanism Unit 35

The growth control mechanism unit 35 is supplied with various states recognized as a state recognition signal S20 based on the external information signal S2 and internal information signal S1 given from the state recognition mechanism unit 30. As described above, the various states includes inputs entered through the touch sensor 18, not strong enough to be identified with, for example, 'stroked' or 'patted', in addition to particular states conveyed to the feeling/instinct modeling unit 31 and behavior determining mechanism unit 32.

Figure 13:
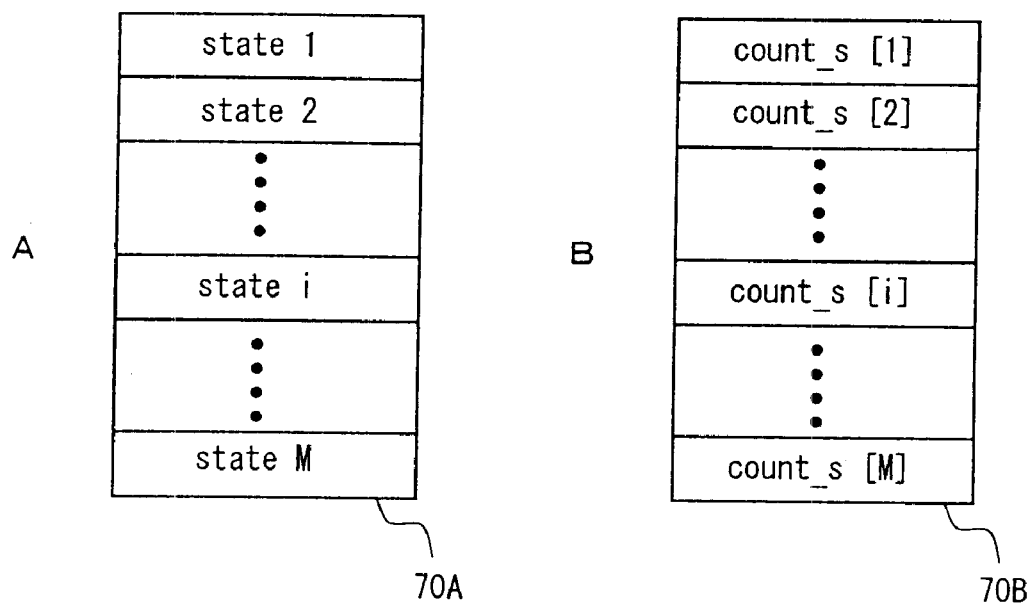
FIGS. 13(A,B) is a conceptual diagram of a first growth element list and first growth element counter table.

The growth control mechanism unit 35 also has inside the memory 10A the list 70A (referred to as the first growth element list) as shown in FIG. 13A containing the foregoing growth elements which should be referenced in raising a [growth stage] of the various states based on the state recognition information S20 given from the state recognition mechanism unit 30, and the counter table 70B (referred to as the first growth element counter table) as shown in 13B to count the accumulated number of frequencies of these growth elements.

The growth control mechanism unit 35, given the state recognition information 20 from the state recognition mechanism unit 30, judges whether or not a state to be obtained based on the state recognition information 20 referring to the first growth element list 70A, and if this state is found to be a growth element, the corresponding count value (experience value) in the growth counter table 70B is increased by '1'.

Figure 14:
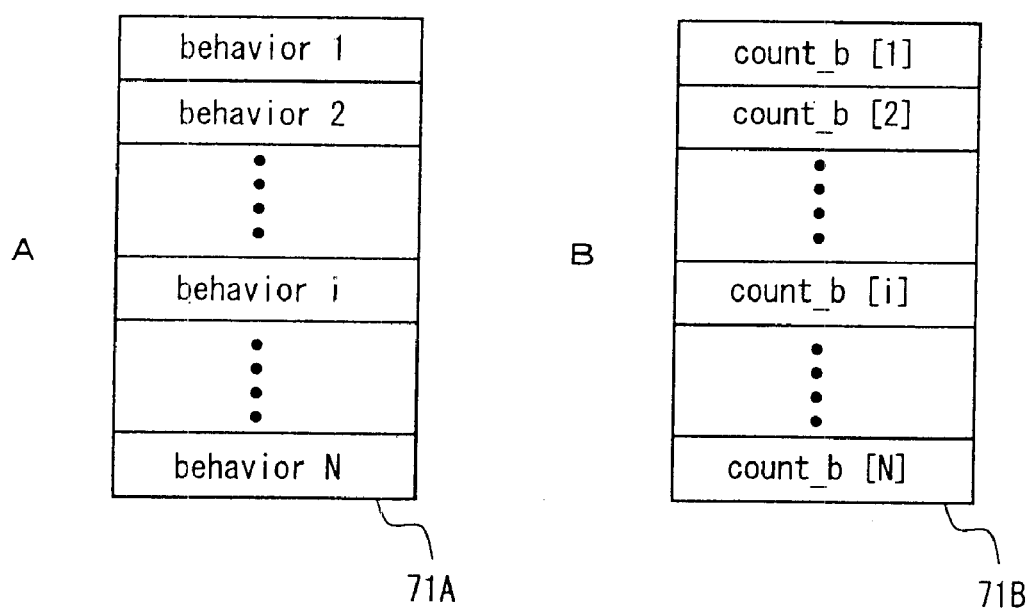
FIGS. 14(A,B) are conceptual diagram of a second growth element list and second growth element counter table.

Also, the growth control mechanism unit 35 has inside the memory 10A the list 71A (referred to as the second growth element list) as shown in FIG. 14A, containing the foregoing growth elements which should be referenced in raising a [growth stage] of the various behaviors to be obtained based on the behavior command information S14 given from the behavior determining mechanism unit 32, and the counter table 71B (referred to as the second growth element counter table) as shown in FIG. 14B to count the accumulated number of frequencies of these growth elements.

The growth control mechanism unit 35, given the behavior command information S14 from the behavior determining mechanism unit 32, judges whether or not a behavior or motion to be obtained is a growth element based on the behavior command information S14 referring to the second growth element list 71A, and if this behavior is found to be a growth element, the corresponding count value (experience value) in the second growth counter table 71B is increased by '1'.

Furthermore, when the counter values in the first and second growth element counter tables 70B, 71B are increased as described above, the growth control mechanism unit 35 increases the count value by '1' of the counter (referred to as 'integrated growth experience value counter' hereinafter) to judge whether or not a [growth stage] prepared separately from the first and second counter tables 70B, 71B and judges whether or not the counter value of the integrated growth experience value counter has reached the counter value preset as a termination condition for the current 'growth stage'.

If the counter value of the integrated growth experience value counter has reached the counter value preset as a termination condition for the current 'growth stage', the growth control mechanism unit 35 determines a behavior or motion within the next 'growth stage to which the current behavior or motion should be transformed based on each count value in the first and second growth element counter tables 70B, 71B, the results of which are conveyed to the feeling/instinct modeling unit 31, behavior determining mechanism unit 32 and posture transition mechanism unit 33. However, if the pet robot 1 is in the initial stage, a command is given to the feeling/instinct modeling unit 31, behavior determining mechanism unit 32 and posture transition mechanism unit 33 to select the behavior and motion models for 'Child'.

As a result, the feeling/instinct modeling unit 31 changes, based on the command transforming information S22, the parameter of each of the intensity increase/decrease function 42A~42G described in FIG. 5 to the value of a behavior or motion designated. The behavior determining mechanism unit 32 transforms a behavior model to be used to that of a behavior and motion model designated based on the command transforming information S22. The posture transition mechanism unit 33 changes the setting, so that the directed arc and self-acting arc of a behavior and motion model designated is selected according to the command transforming information S22 in such a case that any directed arc or self-acting arc must be selected from among the directed arcs and self-acting arcs corresponding to a plurality of subsequent behavior and motion models.

As can be known from the foregoing, the behavior and motion model comprises the parameter value of each of the intensity increase/decrease function 42A~42B in the feeling/instinct modeling unit 31 corresponding to the [behavior pattern] in a particular [growth state], a behavior model in the behavior determining mechanism unit 32, and a directed arc or self-acting arc in the posture transition mechanism unit 33.

In this manner the controller lets the pet robot 1 generate behaviors to be capable of acting autonomously, raising the 'growth stage' as required.

(1-3) Growth Control Processing Procedure RT1

Figure 15:
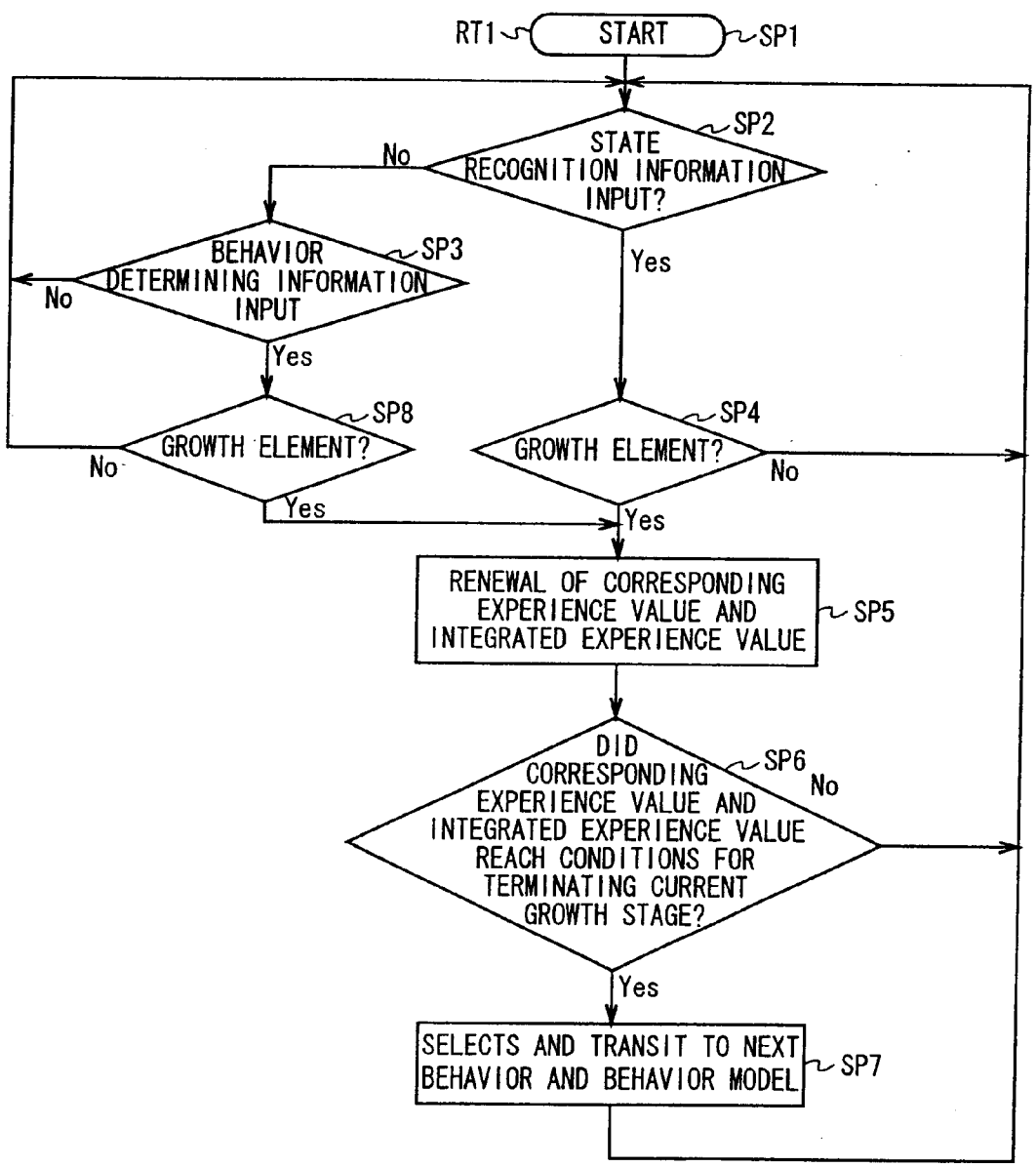
FIG. 15 is a flowchart of a growth control processing procedure.

The growth control mechanism unit 35 controls the 'growth stages' of the pet robot 1 according to a growth control processing procedure RT1 as shown in FIG. 15.

The growth control mechanism unit 35 starts executing this growth control processing procedure RT1 at the step SP1 after the power is turned on for the first time, and judges at the subsequent step SP2 whether or not state recognition information S10 is given from the state recognition mechanism unit 30.

If a negative result is obtained at the step SP2, the growth control mechanism unit 35 proceeds to the step SP3 and judges whether or not behavior determining information S14 is given from the behavior determining mechanism unit 32 (FIG. 4). The growth control mechanism unit 35 returns to the step SP2 if a negative result is obtained at the step SP3 and repeats an SP2-SP3-SP2 loop operation until an affirmative result is obtained at the step SP2 or step SP3.

When an affirmative result is obtained at the step SP2 in due course, the growth control mechanism unit 35 proceeds to the step SP4 and judges whether or not a state to be obtained is a growth element according to the state recognition information S10 given from the state recognition mechanism unit 30.

The growth control mechanism unit 35 returns to the step SP2 if a negative result is obtained at the step SP4, while if an affirmative result is obtained, the growth control mechanism unit 35 proceeds to the step SP5, and increases by '1' a count value corresponding to the first growth element list 70A (FIG. 13A) and a count value of the integrated experience value counter.

Subsequently the growth control mechanism unit 35 proceeds to the step SP6 and judges whether or not the value of the integrated experience value counter reaches the count value preset as a termination condition for the current 'growth stage'.

The growth control mechanism unit 35 returns to the step SP2 if a negative result is obtained at this step SP6, while if an affirmative result is obtained, it proceeds to the step SP7 and determines a behavior and motion model in the subsequent 'growth stage to which the current behavior and motion model should transit, the result of which is conveyed to the feeling/instinct modeling unit 31, behavior determining mechanism unit 32 and posture transition mechanism unit 33, and then the growth control mechanism unit 35 returns to the step SP2.

If an affirmative result is obtained at the step SP3, the growth control mechanism unit 35 proceeds to the step 8 and judges whether or not a behavior to be obtained is a growth element according to the behavior determining information S13 given from the behavior determining mechanism unit 32.

The growth control mechanism unit 35 returns to the step SP2 if a negative result is obtained at this step SP8, while if an affirmative result is obtained, the growth control mechanism unit 35 proceeds to the step SP5 and increases by '1' the count value corresponding to the second growth element list 71A (FIG. 14A) and the count value of the integrated experience value counter respectively, and proceeds to the step SP6 to execute a process similar to the foregoing.

(1-4) Operations and Effects in the Present Embodiment

Configured as described above, the pet robot 1 grows gradually to behave and act like an adult as the user exerts such an action as 'pat' or 'stroke' on the pet robot 1, or gives it a command with using the sound commander, or the pet robot itself 1 plays with the ball.

Consequently the pet robot 1 may give a greater sense affinity and satisfaction to the user, exceeding the concept that the robot just walks.

Also, as the pet robot 1 'grows', its 'behavior patterns are varied according to the input history from the user and the history of behaviors and motions of its own, hence it may give a greater sense of amusement (entertainingness) to the user.

With the foregoing configuration wherein the behaviors and motions of the pet robot 1 are transformed as if it grew based on the actions and commands exerted on it by the user and the behaviors and motions of the pet robot itself, so that the pet robot 1 may give a greater sense of affinity and satisfaction to the user. Thus a pet robot may be realized whose amusement quality is substantially enhanced for the user.

(1-5) Other Modes of Carrying Out the Present Invention

In the mode of the foregoing first embodiment, elucidation is given on the case wherein the present invention is applied to the four-footed robot configured as shown in FIG. 1. However, the present invention is not limited to it, but applicable widely to robots of a variety of other structures.

In the mode of the foregoing first embodiment, elucidation is given on the case wherein the controller 10, actuators $21_1 \sim 21_n$ (FIG. 2) and speaker (FIG. 2), etc. are used as behavior and motion generation means to generate behaviors and motions based on the behavior and motion models. However, the present invention is not limited to it, but a variety of other structures may be employed as behavior and motion generation means, depending upon the mode of a robot embodying the present invention.

Also, in the mode of the foregoing first embodiment, elucidation is given on the case wherein the growth control mechanism 35 of the controller 10 is used as behavior and/or motion transforming means to transform the behavior and/or motion models into behavior and/or motion models of a higher growth level at a given timing, based on at lease either of the input history from the outside and the history of behaviors and/or motions of its own. However, the present invention is not limited to it, but a variety of other structures may be used as behavior and/or motion transforming means, depending upon the mode of a robot embodying the present invention.

Furthermore, in the mode of the foregoing first embodiment, elucidation is given on the case wherein a robotic device 1 'grows' by stages. However, the present invention is not limited to it, but the robotic device may be so designed as to 'grow' with no stages by detecting a state of growth elements and by varying the values of the control parameters in order every time a behavior or motion of the growth elements is performed.

Furthermore, in the mode of the foregoing first embodiment, elucidation is given on the case wherein the robotic device 'grows' by four (4) stages: 'Baby', 'Child', 'Young', and 'Adult'. However, the present invention is not limited to it, but the number of 'growth stages' may be set to other numbers than the number four (4).

Figure 16:
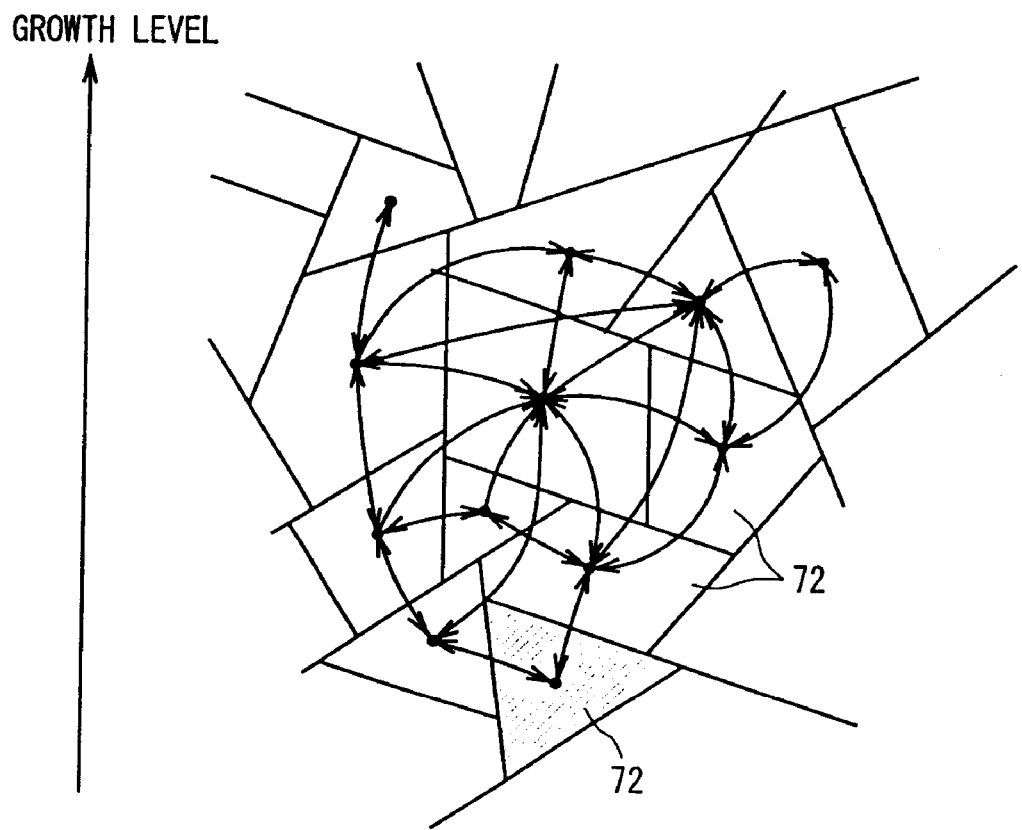
FIG. 16 is a conceptual diagram of other embodiments.

In this case, similarly to the growth stage model shown in FIG. 16, for example, when the transition enable conditions are satisfied in a certain cell 72, the robotic device 1 may be designed to 'grow' in such a way that it is allowed to transit to a cell 72 of the cells 72 adjacent to it, which is higher than its own growth level.

Furthermore, in the mode of the foregoing first embodiment, elucidation is given on the case wherein the history of contact inputs through the touch sensor 18 (FIG. 2) and the history of photographs by means of the CCD camera 17 (FIG. 2) and command inputs with use of sound commander, etc. are used as the input history from the outside. However, the present invention is not limited to it, but the user may use the input history by other means in addition to the foregoing or other means only than the foregoing.

Furthermore, in the mode of the foregoing first embodiment, elucidation is given on the case wherein a plurality of behavior and motion models are prepared for each 'growth stage' after 'Baby'. However, the present invention is not limited to it, but the only behavior and motion model may be prepared for each stage.

Furthermore, in the mode of the foregoing first embodiment, elucidation is given on the case wherein the four items of 'walking state, 'motion', 'behavior', and 'sound' are designated as variables to vary along with 'growing'. However, the present invention is not limited to it, but other items than the foregoing may be used as variable to go along with 'growing'.

Furthermore, in the mode of the foregoing first embodiment, elucidation is given on the case wherein the pet robot 1 is so designed as to 'grow' based on the integrated experience value calculated based on the integrated value of the accumulated sum of frequencies of each growth element. However, the present invention is not limited to it, but a wide range of other calculation means may be employed to calculated the integrated experience value.

Furthermore, in the mode of the foregoing first embodiment, elucidation is given on the case wherein the 'growth stage' of the pet robot 1 is raised based on the input history from the outside and the history of its own behavior and motion. However, the present invention is not limited to it, but only one of the input history and the history of the behaviors and motions of its own may be used as an element to raise the 'growth stage'. As well, other elements than the input history, and the history of its own behavior and motion may be added to the means to raise the growth stage.

In the case of adding other elements than the input history and the history of its own behaviors and motions, the lapse of time and other things may be practically considered as the element. In using the lapse of time to raise the 'growth stage', for example, it may be advisable to provide a growth element counter table for the lapse of time, of which value is counted every time a given period of time elapses, and to use the counted value of the growth element counter table, too, as a material to renew the integrated experience value.

Also, it may be advisable to let the pet robot 1 appraise the degree of achievement of a certain behavior and motion of its own, for example, a state of growth from a child able to walk on its feet to an adult capable of kicking the ball far away, with the use of a given appraisal function, whose result may be used as an element to raise the 'growth stage'.

Figure 17:
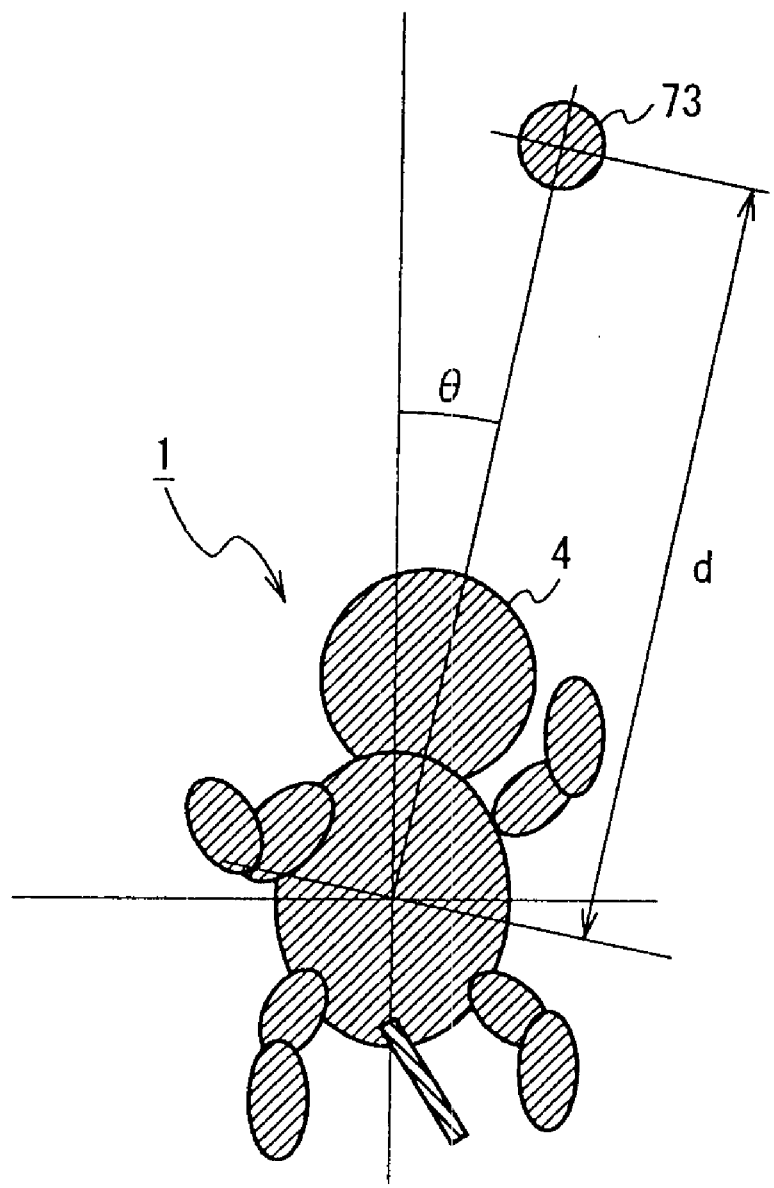
FIG. 17 is a conceptual diagram of other embodiments.

As shown in FIG. 17, for example, it is conceivable to let the pet robot 1 appraise the achievement degree [F] of an action 'kick the ball' by the appraisal function f (d, θ) as defined by the growth control mechanism unit 32 (FIG. 4) for an action 'kick the ball', and obtainable from the following expression:

$$F = a \times d \times \cos(\theta)$$

where,
d is the distance to the ball 73 kicked with the center of coordinates of the pet robot 1 as the origin,
θ is the direction in which the ball is kicked, and,
a is a positive coefficient.

If the foregoing degree of achievement F exceeds the threshold value preset for the current 'growth stage', it may be raised to the next 'growth stage'. The distance d to the ball 73 can be measured by a distance sensor provided separately, and the direction θ based on the output of an encoder (not shown in FIG.) to measure the angle of rotation of the output axis of the actuator $21_i$ ($i$ is any of 1~n) to rotate the head unit 4 in the direction of the roll. In this case, the farther the ball is kicked in the straight line, the larger the degree of achievement F gets.

A wide variety of other behaviors and motions than an action 'kick the ball' may be used as objects to be appraised, for example, 'walk' (the speed of walking is appraised).

The degree of achievement of such behaviors and motions is constantly calculated, and the next 'growth stage' or behavior patterns (Baby 1, Child 1, Child 2, Young 1~Young 3, Adult 1~Adult 4) may be determined based on the maximum value of the degree of achievement obtained in the process of (the pet robot 1) 'growing' according to the foregoing input history and the history of behaviors and motions of its own.

(2) Second Mode of Carrying Out the Present Invention (2-1) Structure of a Pet Robot 80 in a Second Mode of Carrying Out the Present Invention The [80] in the FIG. 1 shows a pet robot in whole in the second embodiment, which is constructed in a way similar to the pet robot 1 in the first embodiment, except that a different method is employed for transforming behavior and motion models.

Figure 18:
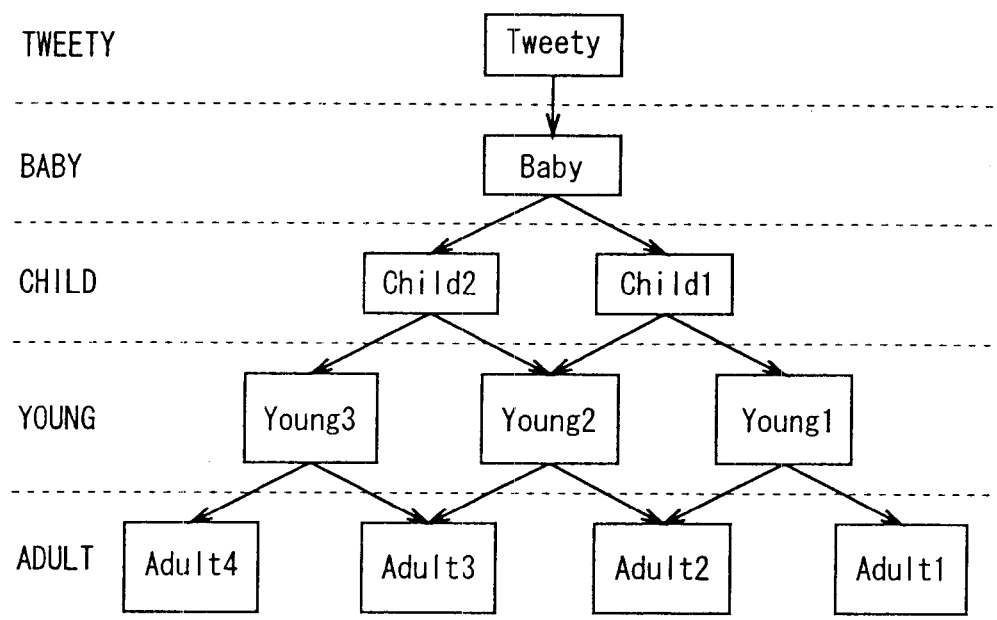
FIG. 18 is a conceptual diagram of growth models in a second embodiment.
Figure 19:
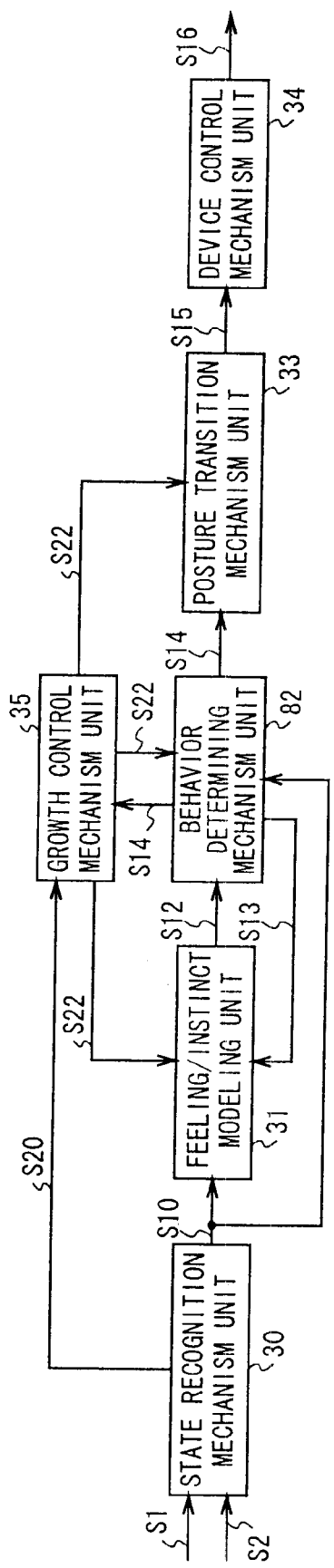
FIG. 19 is a block diagram instrumental in describing the processing of the controller in the second embodiment.

More concretely the five (5) 'growth stages' are provided for the pet robot 80 as shown in FIG. 18: 'Tweety', 'Baby', 'Child', 'Young', and 'Adult'. With the pet robot 80 the contents the controller 81 (FIG. 2) processes are divided into the units as shown in FIG. 19, wherein the same reference numerals are assigned to the units corresponding to those in FIG. 4, That is, the controller 81 is constructed in the same way as the controller is in the first embodiment, except for a behavior determining mechanism unit 82 which has an enormous amount of state space in which all the behavior patterns the pet robot 80 may realize are stored.

The behavior determining mechanism unit 82 creates behavior and motion models for each stage in such a way that with a portion of the state space as a core in which the basic behaviors are generated for the pet robot 80, such as 'walk', 'Sleep' and 'Stand', etc., the only small part of the core is used for 'Tweety'. After that, every time the pet robot 80 grows, it is allowed to transit to new partial state space to be increased (partial state space in which new behaviors may take place and a series of behavior patterns are generated) and separate the partial state space which is used no longer (partial state space in which behaviors never take place and a series of behavior patterns are not generated).

In the pet robot 80 the method in which the transition probability to the state space is varied as it grows is used as a means to allow it to transmit to new partial state space to be increased and cut off unnecessary partial state space.

Figure 20:
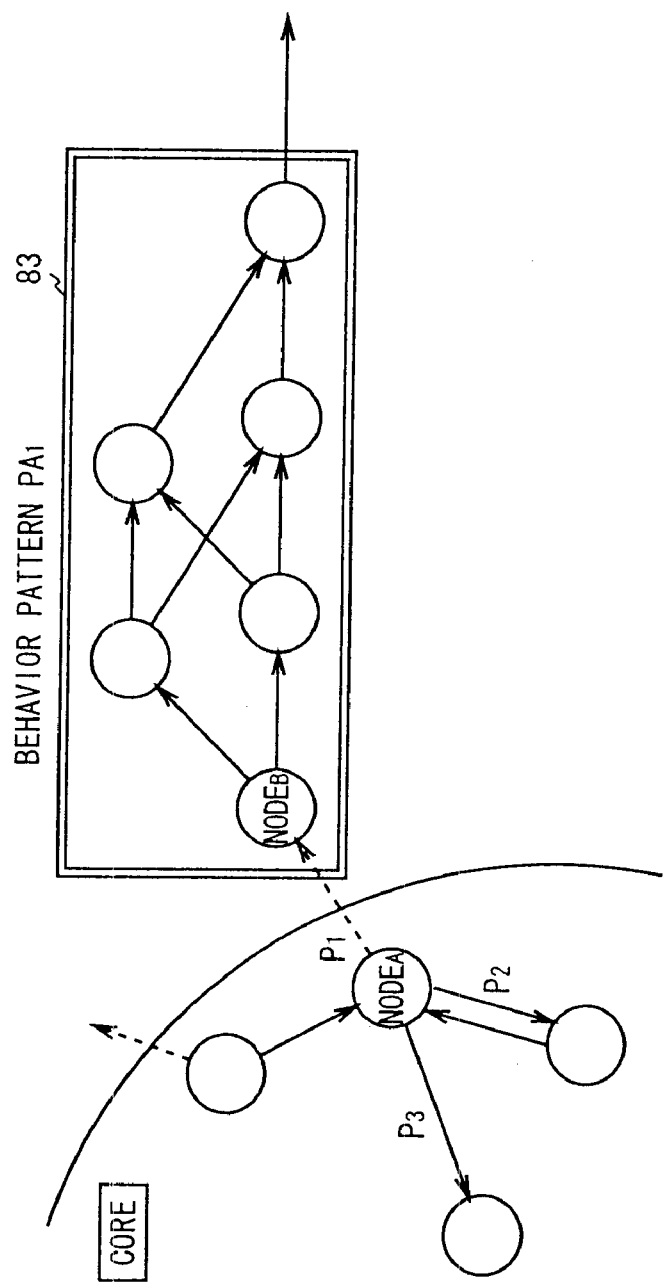
FIG. 20 is a conceptual diagram instrumental in describing the acquisition and lapse of memory of the behavior patterns attendant upon growth.

In FIG. 20, for example, assuming that an event [found a ball] is the transition condition to transit from $NODE_A$ to $NODE_B$ and that a series of evens, such as [approach and kick the ball] are the transition condition to transit from $NODE_B$ to a series of node group 82, when the ball is found at the $NODE_A$ a behavior pattern $PA_1$ 'chase and kick it' takes place with transition probability $PA_1$. However, in case the transition probability $P_1$ is 0, the behavior pattern $PA_1$ never takes place.

To let the pet robot 80 materialize such a behavior pattern $PA_1$, the transition probability $P_1$ is set to '0' in the initial stage and varied to a greater preset value than '0' when it arrives at a corresponding 'growth stage.

As opposed to it, to let the pet robot 80 forget the behavior pattern $PA_1$ when a certain 'growth stage' is attained, the transition probability from $NODE_A$ to $NODE_B$ is varied to '0' when that 'growth stage' is arrived at.

With the pet robot 80 the files 84A~84D as shown in FIG. 21 (referred to as 'differential files' hereinafter) are provided in each behavior and motion model, each corresponding to each 'growth stage of 'Baby', 'Child', 'Young', and 'Adult', as a concrete means to vary the transition probability at the necessary places.

Stored in the differential files 84A~84D are: the name of node (number) of the node (equivalent to $NODE_A$ in FIG. 20) whose transition probability should be varied to have the new behaviors as the foregoing take place when the 'growth stage' goes up, place of the node in the state transition table 50 (FIG. 7) in which transition probability should be varied, and a varied transition probability in the corresponding place.

The behavior determining mechanism unit 82 generates behaviors using the behavior and motion models for 'Tweety in the initial stage, while when notification is given later from the growth control mechanism unit 35 that a 'growth' is attained as described before, the transition probability at each place appointed for each node defined in the corresponding differential file 84A~84D is varied to the predetermined value based on the differential file 84A~84D for the corresponding 'growth stage'.

In the cases shown in FIG. 7 and FIG. 21 by way of example, when the growth stage 'Baby is attained, the transition probability located at the first column, on the first line in the area (portion below the line of [Output Behavior] and to the right of the [Range of Data] column) where transition probabilities in the state transition table 50 of the node $NODE_{100}$ are defined, is varied to [20] [%], and the transition probability located at the $n^{th}$ column, on the first line in the state transition table to [30] [%], and so on. At the same time the behavior determining mechanism unit 82 varies the corresponding transition probability of other node $NODE_{320}$, $NODE_{720}$ . . . defined in the file 84A for 'Baby' as well.

As in this case, included among the transition probabilities whose values are to be varied, is a case wherein the transition probability up to a certain time is [0] (that is, transition to a node to be the origin of a series of behavior patterns is prohibited), or a case wherein the transition probability after being varied becomes [0] (that is, transition to a node to be the origin of a series of behavior patterns is to be prohibited). As described in the foregoing, the case may occur that the transition probability is varied to a given value from [0], that the value of the transition probability after being varied becomes [0], that a series of the behavior patterns take place at a new 'growth stage', or that a series of the behavior patterns do not take place.

Even in the case wherein necessary transition probabilities are varied in this manner the value of each transition probability in each of the differential file 84A~84D is so designated that the sum of each transition probability included in the corresponding line in the state transition table 50 after being varied becomes 100 [%].

Figure 22:
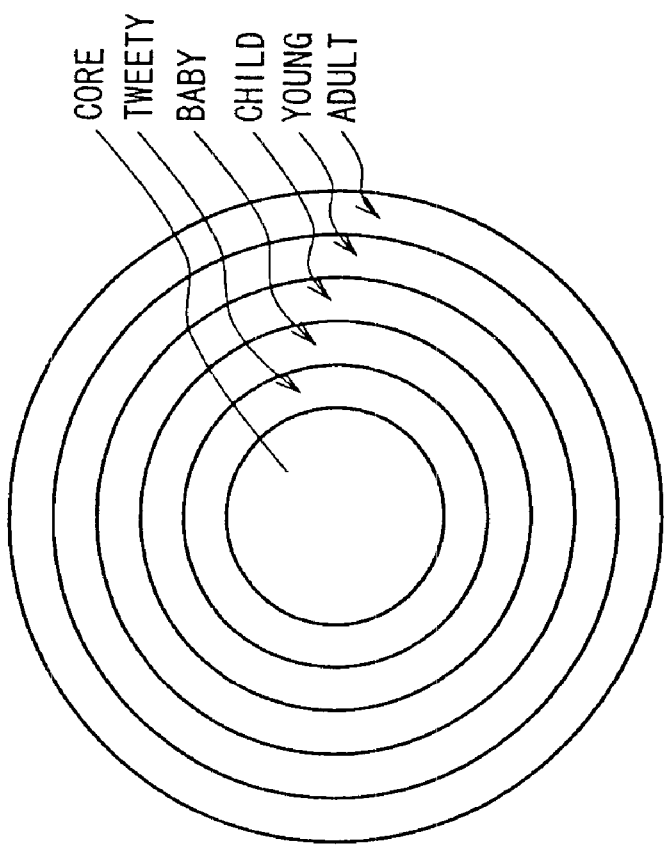
FIG. 22 is a conceptual diagram instrumental in describing a transforming method for behavior and motion models.
Figure 23:
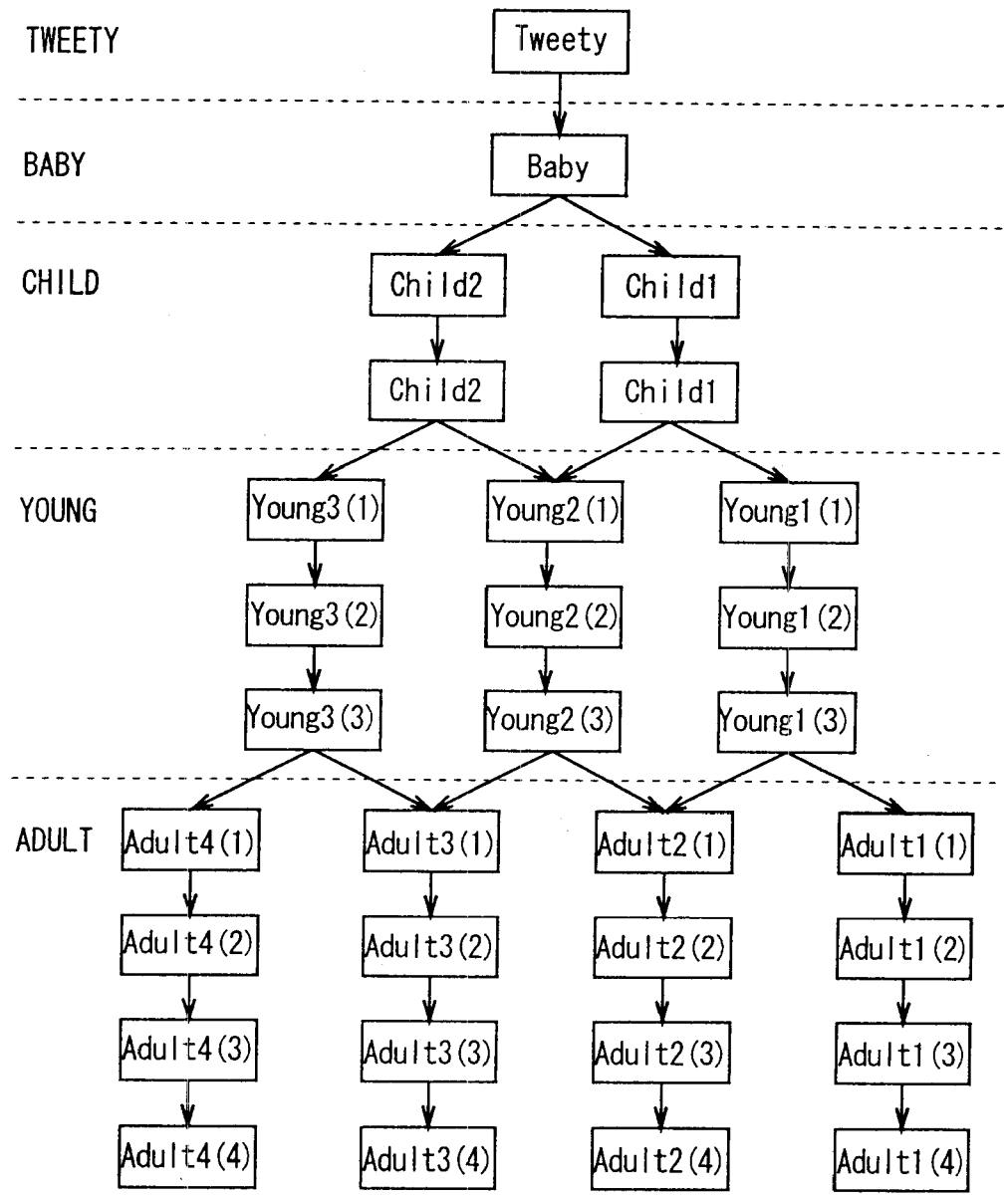
FIG. 23 is a conceptual diagram instrumental in describing other embodiments.

Thus, as shown in FIG. 22 by way of example, the state space of the behavior and motion models for each 'growth stage' expands in order as the pet robot 80 grows.

(2-2) Operations and Effects in this Mode of Carrying Out the Present Invention

Configured as in the foregoing, the pet robot 80 generates the behavior and motion models for each 'growth stage and behaves according to the behavior and motion models generated in such a manner that with a portion of the state space where the basic behaviors are conducted as the core, out of the enormously expanded state space where all the behavior patterns are stored, only a small portion including the core is used for 'Tweety, and that a portion of the state space no longer to be used except for the core, is separated as the pet robot 80 grows, or that transition to another portion of the state space to be added is allowed as the pet robot 80 grows.

With the pet robot 80, accordingly it is possible to represent 'growth' more naturally because the state space of the behavior and motion models in each 'stage growth' varies so continuously as to alleviate the discontinuity of the output behaviors before and after a certain 'growth'. Also, with the pet robot 80, since the portion of the state space where the basic behaviors are generated is used in common for all the 'growth stages', the result of learning of the basic behaviors can be handed down to the next 'growth stage' in order.

Furthermore, with the pet robot 80, since a portion of the state space in which the basis behavior is generated is used in common for all the 'growth stages', the work of generating the behavior and motion models for each 'growth stage' can be done easily, and the amount of data of the behavior models are curtailed on the whole compared to the first mode wherein the behavior and motion models are prepared individually for each 'growth stage'.

Furthermore, in the pet robot 80, since the behavior and motion models for each 'growth stage' are generated by cutting off portions of the state space for a series of unnecessary behavior patterns and by allowing transition to a state space for a series of necessary behavior patterns as the pet robot 80 grows, each of a series of behavior patterns is modularized, enabling the behavior determining mechanism unit 82 to do generation work more easily as much.

Configured as in the foregoing, with the partial state space as the core, in which the basic behaviors are conducted, out of the enormous state space where all the behavior patterns are stored, the only portion including the core is used for 'Tweety', since portions of the state space not to be used any longer except for the core are separated and the behavior and motion models for each 'growth stage' are generated by allowing transition to a portion of the state space to be added anew, the state space of the behavior and motion models for each 'growth stage' can be varied continuously, thereby curtailing the discontinuity of output behaviors before and after a certain growth. Consequently the 'growth' is represented more naturally, and a pet robot can be realized with a greatly increased entertaining quality.

(2-3) Other Modes of Carrying Out the Present Invention

In the foregoing second embodiment elucidation is given on the case wherein the partial state space in which the basic behaviors are generated is used in common for all the 'growth stages', but the present invention is not limited to it. Each 'growth stage' may be divided into portions, and the partial state space in which the basic behaviors are generated may be used in common for each of divided portions of each 'growth stage'.

Furthermore, in the foregoing second embodiment elucidation is given on the case wherein the state space for the behavior and motion models for each 'growth stage' expands in order. However, the present invention is not limited to it, but the state space for the behavior and motion models for each 'growth stage' may be reduced in order, or the state space for the behavior and motion models may be reduced in any of the 'growth stages' while still expanding.

Figure 24:
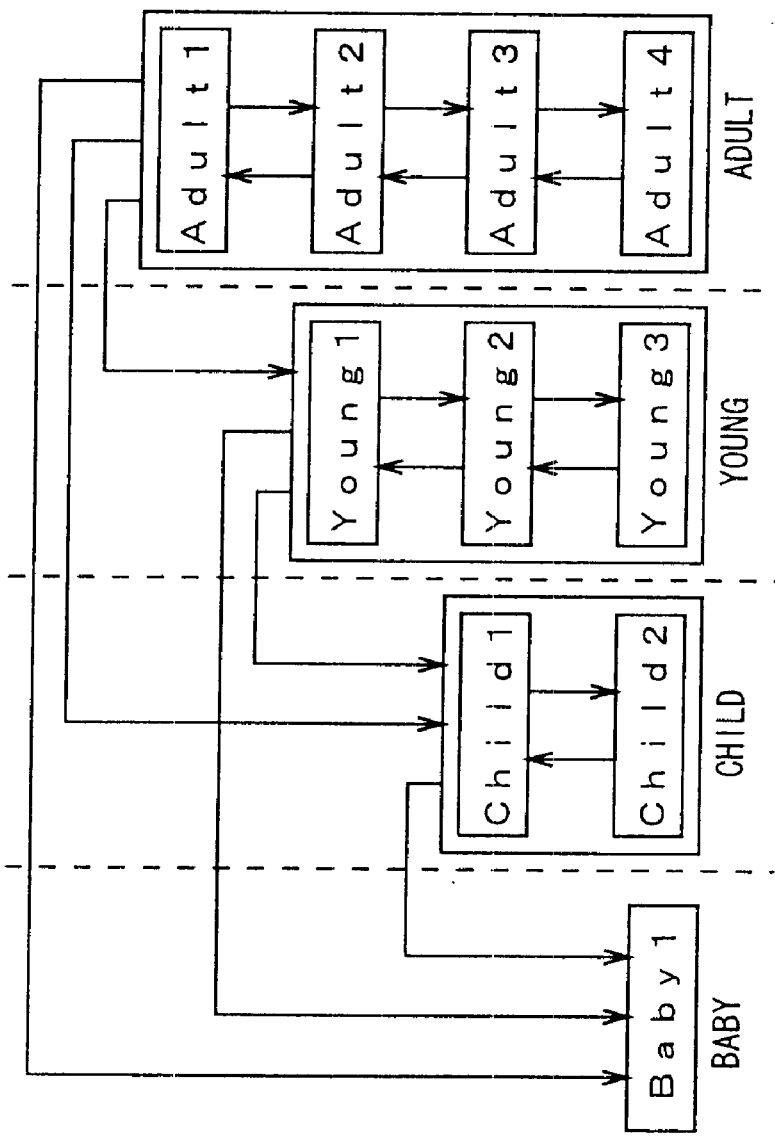
FIG. 24 is a conceptual diagram of behavior pattern transforming and retrogressive models in a third embodiment.

(3) Third Mode of Carrying Out the Present Invention (3-1) Structure of a Pet Robot 90 in the Third Mode The 90 in FIG. 1 shows a pet robot in the third mode of the carrying out the present invention. The pet robot 90 is configured in the same way as the pet robot 1 in the first embodiment, except that, in addition to the growth function described in the first embodiment, the pet robot 90 is, as shown in FIG. 24, provided with a function to transform the behavior patterns (Baby 1, Child 1, Child 2, Young 1~Young 3, Adult 1~Adult 4) in the same 'growth stage' as required according to the history of input operations executed by the user and the history of the behaviors and motions of its own, and to retrograde the 'growth stage (namely, to transform the behavior patterns to those in a 'growth stage' of a lower growth level. This function is referred to as 'behavior pattern transform/retrograde function' hereinafter).

It means that in the case of the pet robot 90, in addition to counting each growth element described in FIGS. 13A, 13B, the controller 91 (FIG. 2) is so designed as to constantly watches for and count generation in respect to a plurality of elements (referred to as 'behavior pattern transform elements' hereinafter) related to predetermined 'behavior pattern transformation', such as 'saw a color the pet robot 90 likes', 'played with the ball', 'the ball taken away', and 'time (during which the pet robot 90 is) left alone'.

In the case of the present embodiment each of the following, too, is reckoned as a behavior pattern transforming element and counted separately from the counting of the growth elements: command input with the use of the sound commander, enforced learning comprising sensor inputs corresponding to actions 'stroke' and 'pat' through the touch sensor 18 (FIG. 2) and the number of successes in performing predetermined behaviors and motions, sensor inputs not corresponding to actions 'stroke' and 'pat' through the touch sensor 18, and each of the foregoing growth elements of a given behavior and motion like 'play with the ball'.

The controller 91 then transforms a behavior and motion model to be used, into another behavior and motion model in the same 'growth stage' regardless of 'growth' when the total value of accumulated sums of these behavior pattern transforming elements (referred to as 'integrated experience value of the behavior pattern transforming elements' hereinafter) exceeds a preset threshold value.

It is the accumulated number of frequencies of embodiment of each behavior pattern transforming element that determines which behavior and motion model of the other behavior and motion models is used as the next behavior and motion model. In the case, for example, that the behavior and motion model used up to the then moment is a behavior and motion model (Young 2) of the 'normal' behavior patterns for 'Young', when the accumulated sum of frequencies of a behavior pattern transforming element of the behavior pattern transforming elements that deteriorates a predetermined behavior pattern, such as 'patted' or 'time (through which the pet robot 90 is) left alone, is greater than that of the other behavior pattern transforming elements, the behavior and motion model (Young 1) of 'irritated' behavior pattern for 'Young' is selected. As opposed to it, when the accumulated sum of frequencies of a behavior pattern transforming element of the behavior pattern transforming element that ameliorates a predetermined behavior pattern, such as 'stroked' or 'saw a color the pet robot 90 likes' is greater than that of the other behavior pattern transforming elements, the behavior and motion model (Young 3) of a 'calm' behavior pattern for 'Young' is selected.

The other behavior models within the same 'growth stage' to which the currently used behavior and motion model is allowed to transform, are predetermined, namely limited to the behavior and motion models connected by the arrow lines.

Accordingly, in the case, for example, that a behavior and motion model being used is the behavior and motion model (Adult 3) of 'a bit calm' behavior pattern for 'Adult', either the behavior and motion model (Adult 2) of 'a bit wild' behavior pattern, or the behavior and motion model (Adult 4) of a 'calm' behavior pattern only can be selected as the next behavior and motion model, and the behavior and motion model (Adult 1) for an 'irritated' behavior pattern can never be used as the next behavior and motion model.

Meantime, in addition to each of the foregoing behavior pattern transforming element, the controller 91 constantly watches for and count generation in respect to a plurality of predetermined elements relating to the 'retrogression of the growth stages' (referred to as 'retrogressive elements' hereinafter), such as 'fell off the table', 'fell over', or 'received a big impact'.

Then, when the accumulated number of frequencies of embodiment of any retrogressive element exceeds the threshold value preset for each of retrogressive element based on the accumulated number of frequencies of embodiment of each retrogressive element, the controller 91 transforms a behavior and motion model to be used into a behavior and motion model of a 'growth stage' of a lower growth level than the 'growth model' of the behavior and motion model being used up to the then moment.

In transforming the current 'growth stage' to a 'growth stage' of a lower growth level, it is predetermined for each retrogressive element to what stage the current 'growth stage' is retrograded (or, to a behavior and motion model of which 'growth stage'). In the case of an event 'fell off the table, etc.' by way of example, the 'growth stage' is retrograded by two stages if the accumulated number of frequencies is '1' (one stage for 'Child'). If the accumulated number of frequencies of an event 'fell over' exceeds the threshold, the growth stage retrogrades by one stage.

In retrograding the 'growth stage' a behavior and motion model is selected at random which is within the 'growth stages'.

Accordingly, in the case wherein the behavior and motion model used up to the then moment was the behavior and motion model (Adult 1) for an 'aggressive' motion pattern for 'Adult', the behavior and motion model (Young 3) of a 'calm' behavior pattern for 'Young' may be selected due to the retrogression.

As described, the pet robot 90 is designed such that its 'behavior patterns' transform in order even while not 'growing', according to the input history of actions and commands by the user and the history of behaviors and motions of its own, or shocks, etc. just like a real animal transforms its behavior patterns, depending upon how it is reared and as if the mind retrograded due to strong shocks, etc.

(3-2) Processing of Controller 91

Figure 25:
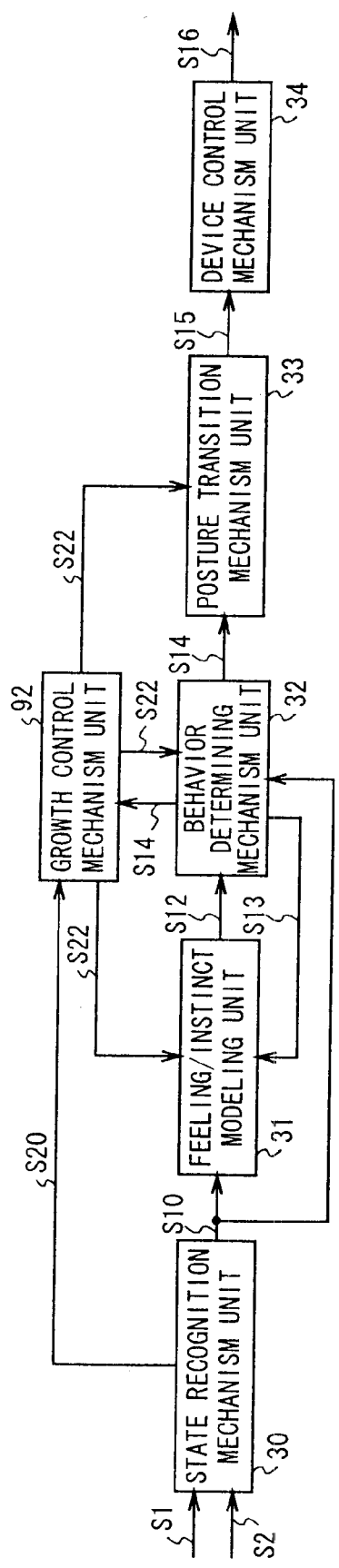
FIG. 25 a block diagram instrumental in describing the processing of the controller in the third embodiment.

The contents the controller 91 of the pet robot 90 processes can be divided as shown in FIG. 25 in terms of functions, wherein the units corresponding to those in FIG. 4 are assigned the same reference numerals. The controller 91 is constructed in the same way as that of the first embodiment, except for a growth control mechanism unit 92.

The [transforming of the behavior patterns] and [retrograding of growth stages] are made under the control of this growth control mechanism unit 92.

Figure 26:
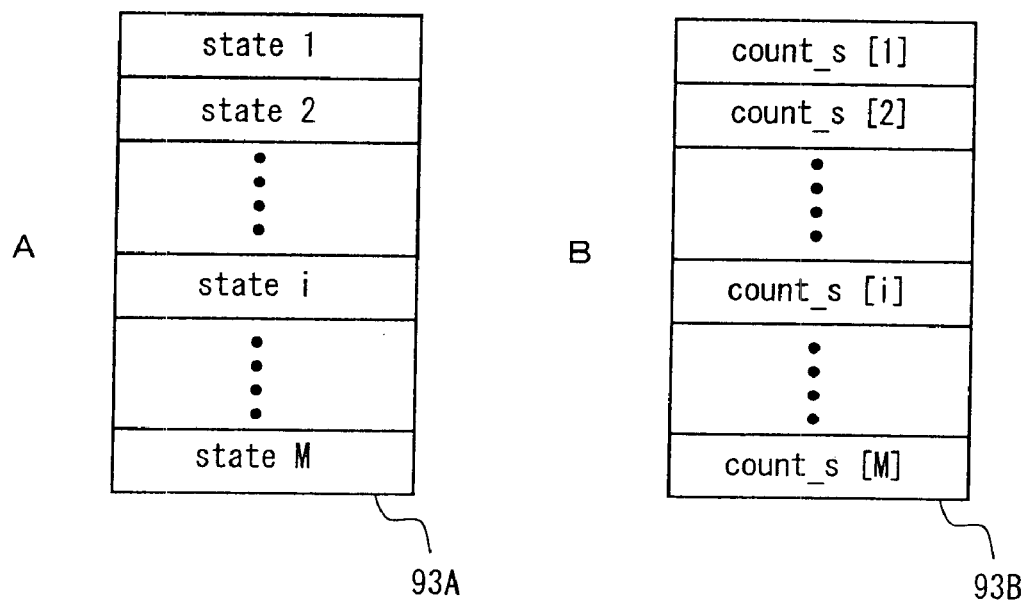
FIGS. 26 (A,B) are conceptual diagram of a first behavior pattern element list and first behavior pattern element counter table.

In practice the growth control mechanism unit 92 executes, in parallel with control processing on 'growth' as in the forgoing first embodiment, control processing on the transformation of behavior patterns with the same 'growth stage' and retrogression of the 'growth stages' as follows:

The growth control mechanism unit 92 stores in a memory 90A a list 93A (referred to as 'first behavior pattern transforming element list' hereinafter) as shown in FIG. 26A wherein the said behavior pattern transforming elements are defined, chosen from among various states based on the state recognition information S20 given from the state recognition mechanism unit 30 that should be referred to in transforming the behavior patterns within the same growth 'stage', and a counter table 93B (referred to as 'first behavior pattern transforming element counter table' hereinafter) shown in FIG. 26B to count each of the accumulated number of frequencies of these behavior pattern transforming elements.

Upon receiving the state recognition information S20 from the state recognition mechanism unit 30 the growth control mechanism unit 92 judges whether or not a state obtained based on the state recognition information S20 is a behavior pattern transforming element based on the first behavior pattern transforming element list 93A, and if the state is found to be a behavior pattern transforming element, the corresponding counter value (experience value) within the first behavior pattern transforming element counter table 93B is increased by '1'.

Figure 27:
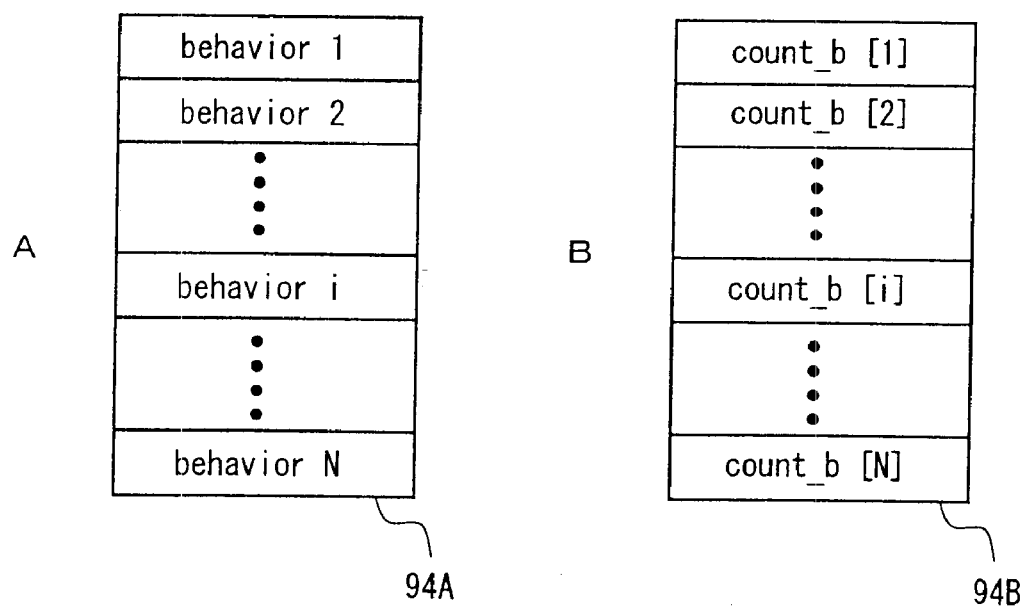
FIGS. 27(A,B) are conceptual diagram of a second behavior pattern element list and second behavior pattern element counter table.

The growth control mechanism unit 92 also stores in a memory 90A a list 94A (referred to as 'second behavior pattern transforming element list' hereinafter) as shown in FIG. 27A wherein the said behavior pattern transforming elements are defined, chosen from among the behaviors and motions based on the behavior command information S14 given from the behavior determining mechanism unit 32 that should be referred to in transforming the behavior patterns within the same growth 'stage', and a counter table 94B (referred to as 'second behavior pattern transforming element counter table' hereinafter) shown in FIG. 27B to count each of the accumulated numbers of frequencies of these behavior pattern transforming elements.

Upon receiving the behavior command information S14 from the behavior determining mechanism unit 32 the growth control mechanism unit 92 judges whether or not a behavior or motion obtained based on the behavior command information S14 is a behavior pattern transforming element based on the second behavior pattern transforming element list 94A, and if the behavior or motion is found to be a growth element, the corresponding counter value (experience value) within the second behavior pattern transforming element counter table 94B is increased by '1'.

Furthermore, when the values within the first or second behavior pattern transforming element counter tables 93B, 94B are increased as in the foregoing, the growth control mechanism unit 92 increases by '1' the count value of the counter (referred to as 'behavior pattern transforming integrated experience value counter' hereinafter) to judge whether or not a behavior pattern should be transformed within the same 'growth stage', which is prepared separately from the first and second behavior pattern transforming element counter tables 93B, 94B), and then judges whether or not the count value of the behavior pattern transforming integrated experience value counter exceeds that preset as a condition to transform the 'behavior pattern'.

If the count value of the behavior pattern transforming integrated experience value counter reaches a count value preset as a condition to transform the 'behavior pattern', the growth control mechanism unit 92 determines that the behavior and motion model should be transformed to which behavior and motion model within the same 'growth stage' based on each of the count values in the first and second behavior pattern transforming element counter tables 93B and 94B, the result of which is conveyed as transforming command information S22 to the feeling/instinct modeling unit 31, behavior determining mechanism unit 32 and posture transition mechanism unit 33.

Consequently the feeling/instinct modeling unit 31 varies the parameter of each of the intensity increase/decrease function 42A–42G to the value of the designated behavior and motion model based on the transforming command information S22. Also, the behavior determining mechanism unit 32 transforms a behavior model to be used into the appointed behavior and motion model based on the transforming command information S22.

The posture transition mechanism unit 33 changes the setting based on the transforming command information S22 such that a directed arc or self-acting arc corresponding to the appointed behavior and motion model is selected in such a case that one of the directed arcs or self-acting arcs must be selected from among the directed arcs and self-acting arcs corresponding to a plurality of behavior and motion models.

In this way the growth control mechanism unit 92 controls the transforming of a behavior pattern within the same 'growth stage' according to the history of actions made by the user, operation input of commands with the use of the sound commander, or the history of behaviors and motions of its own.

Meantime, the growth control mechanism unit 92 stores in the memory 90A a list 95A (referred to as 'retrogressive element list' hereinafter) as in FIG. 28A wherein the said retrogressive elements are defined, chosen from among various states based on the state recognition information S20 given from the state recognition mechanism unit 30 that should be referred to in retrograding the 'growth state', and a counter table 95B (referred to as 'retrogressive element counter table' hereinafter) shown in FIG. 28B to count each of the accumulated numbers of frequencies of these retrogressive elements.

Upon receiving the state recognition information S20 from the state recognition mechanism unit 30 the growth control mechanism unit 92 judges whether or not the state obtained based on the retrogressive element list 95A, and if the state is found to be a retrogressive element, the corresponding counter value (experience value) within the retrogressive element counter table 95 is increased by '1'.

Figure 29:
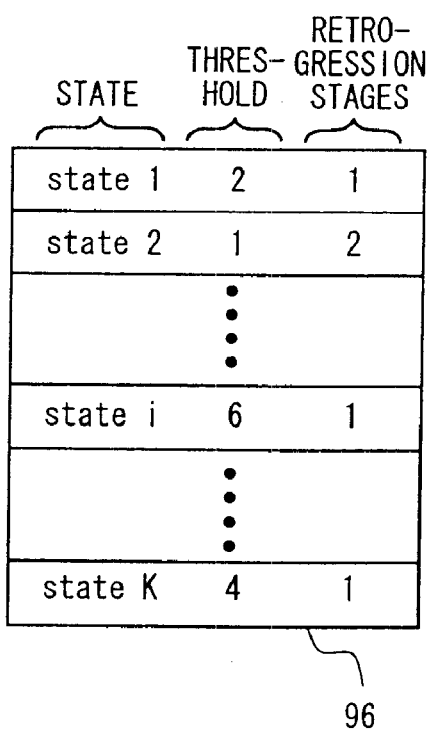
FIG. 29 is a conceptual diagram of a retrogressive state and stage list.

Furthermore, the growth control mechanism unit 92 stores in the memory 90A a list 96 (referred to as 'retrogressive condition and stage number list) as in FIG. 29, containing the threshold value preset for each of the retrogressive elements and the number of retrogressive stages of the 'growth stage' in the case that the accumulated sum of frequencies of the retrogressive element exceeds the threshold value.

When the count value of any of the retrogressive elements within the retrogressive element counter table 95B is increased, the growth control mechanism unit 92 judges whether or not the count value of the retrogressive element exceeds the threshold value preset for the retrogressive element, referring to the retrogressive condition and stage number list 96.

If the count value of the retrogressive list exceeds the corresponding threshold value, the growth control mechanism unit 92 determines at random based on the retrogressive condition and stage number list 96 that the behavior and motion model should be transformed into which behavior and motion model in a 'growth state' lower by as many stages as predetermined for the generation element of the behavior and motion model, the result of which is conveyed as the transforming command information S22 to the feeling/instinct modeling unit 31, behavior determining mechanism unit 32 and posture transition mechanism unit 33.

Consequently the feeling/instinct modeling unit 31 transforms the parameter of each of the increase/decrease functions 42A–42G to the value of the appointed behavior and motion model based on the transforming command information S22. The behavior determining mechanism unit 32 transforms a behavior model to be used into the appointed behavior and model based on the transforming command information S22. Furthermore, the posture transition mechanism unit 33 then changes the setting such that a directed arc or self-acting arc corresponding to the appointed behavior and motion model is selected in such a case that any of directed arc or self-acting arc must be selected from among the directed arcs and self-acting arcs corresponding to a plurality of behavior and motion models.

As described in the foregoing, the growth control mechanism unit 92 controls the retrograding of the 'growth stages' based on the external information signal S2 from the external sensor 19 and the internal information signal S1 from the internal sensor 15.

(3-3) Behavior Pattern Transform Processing Procedure RT2 and Retrogressive Processing Procedure RT3

Figure 30:
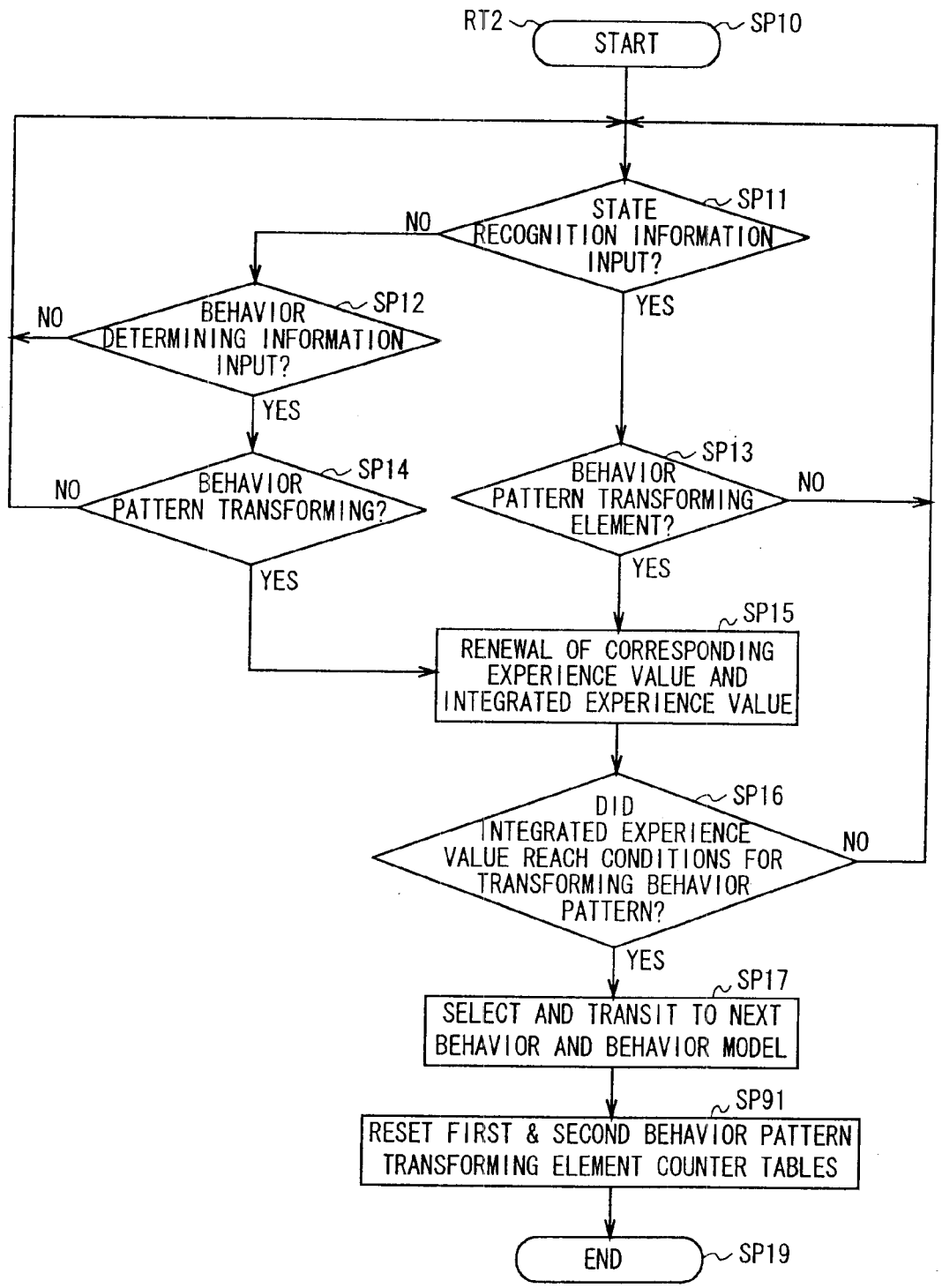
FIG. 30 is a flowchart of a behavior pattern transforming processing procedure.

The growth control mechanism unit 92 executes the processing of the behavior pattern transforming in the same 'growth stage' in accordance with the behavior pattern transform processing procedure RT2 shown in the FIG. 30.

That is to say, the growth control mechanism unit 92 starts executing the behavior pattern transform processing procedure RT2 at the step SP10 ever time the behavior and motion model is transformed, and judges at the subsequent step SP11 whether or not state recognition information S10 is given from the state recognition mechanism unit 30.

If a negative result is obtained at this step SP11, the growth control mechanism unit 92 proceeds to the step SP12 and judges whether or not behavior determining information S14 is given from the behavior determining mechanism unit 32. If a negative result is obtained at this step SP12, the growth control mechanism unit 92 returns to the step SP11 and repeats an SP11-SP12-SP11 loop until an affirmative result is obtained either at the step SP11 or SP12.

When an affirmative result is obtained in due course at the step SP11, the growth control mechanism unit 92 proceeds to the step SP13 and judges whether or not the state to be obtained based on the state recognition information S10 given from the state recognition mechanism unit 30 is a behavior pattern transforming element.

If a negative result is obtained at this step SP13, the growth control mechanism unit 92 returns to the step SP11, while if an affirmative result is obtained, the growth control mechanism unit 92 proceeds to the step SP15 and increases by '1' the corresponding count value in the first behavior pattern transforming element counter table 93B (FIG. 26B) and the count value of the integrated experience value counter for the behavior pattern transforming respectively.

If an affirmative result is obtained at the step SP12, the growth control mechanism unit 92 proceeds to the step SP14 and judges whether or not a behavior or motion to be obtained based on the behavior determining information S14 given from the behavior determining mechanism unit 32 is a behavior pattern transforming element.

If, however, a negative result is obtained at this step SP14, the growth control mechanism unit 92 returns to the step SP11, while if an affirmative result is obtained, the growth control mechanism unit 92 proceeds to the step SP15 and increases by '1' the corresponding count value in the second behavior pattern transforming element counter table 94B (FIG. 27B) and the count value of the behavior pattern transforming integrated experience value counter respectively.

After terminating the processing at the step SP15 the growth control mechanism unit 92 proceeds to the step SP16 and judges whether or not the count value of the behavior pattern transforming integrated experience value counter reaches the count value preset as a condition to transform the current behavior and motion model.

If a negative result is obtained at this step SP16, the growth control mechanism unit 92 returns to the step SP11, while if an affirmative result is obtained, the growth control mechanism unit 92 proceeds to the step SP17 and determines that the behavior and motion model should be transformed to which behavior and motion model in the same 'growth stage, the result of which is conveyed to the feeling/instinct modeling unit 31, behavior determining mechanism unit 32 and posture transition mechanism unit 33.

Furthermore, the growth control mechanism unit 92 proceeds to the step SP18 and resets the first and second behavior pattern transforming element counter tables 93B, 94B such that all the count values in the first and second behavior pattern transforming element counter tables 93B, 94B becomes '0'. The growth control mechanism unit 92 then proceeds to the step SP19 and terminates the behavior pattern transforming processing procedure RT2.

Figure 31:
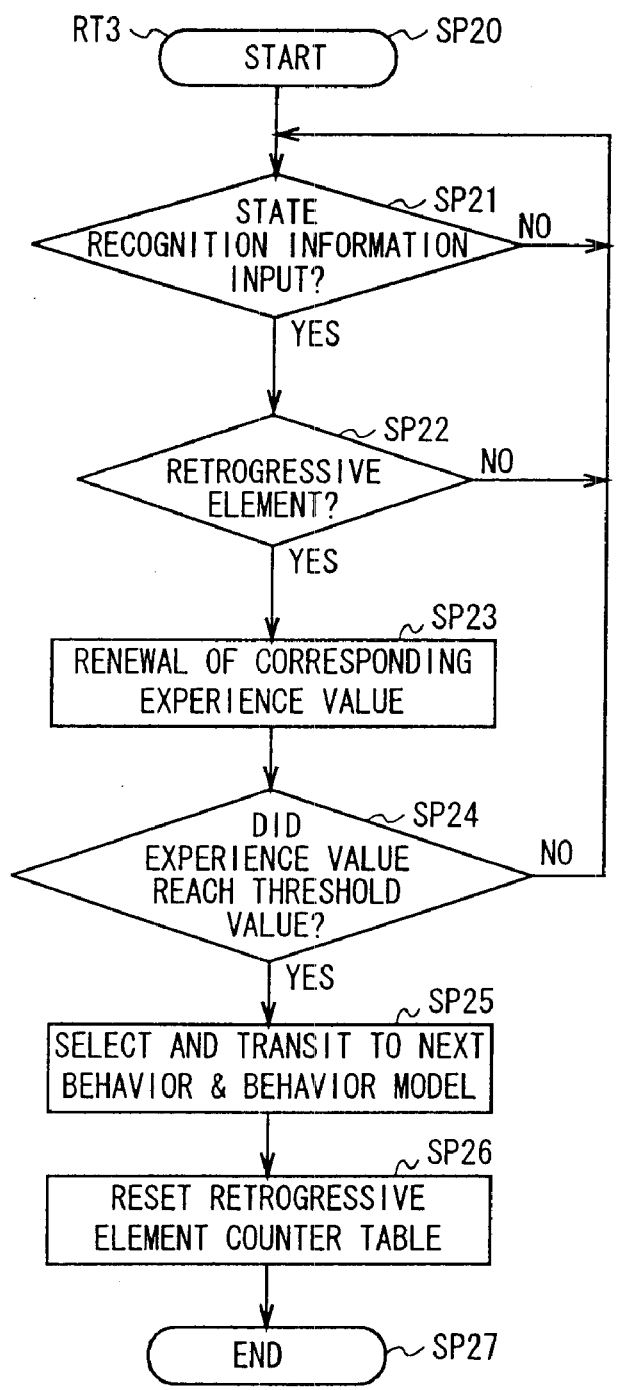
FIG. 31 is a flowchart of a retrogressive processing procedure.

Meanwhile, the growth control mechanism unit 92 executes the control processing of the retrograding of the 'growth stage' according to the retrogressive processing procedure RT3 shown in FIG. 31, in parallel with the foregoing.

That is, the growth control mechanism unit 92 starts executing the retrogressive processing procedure RT3 every time the behavior and motion model is transformed, and then proceeds to the subsequent step SP21 and stands by for state recognition information S10 to be supplied from the state recognition mechanism unit 30.

When an affirmative result is obtained at the step SP21 in due course, the growth control mechanism unit 92 proceeds to the step SP22 and judges whether or not the state to be obtained based on the state recognition information S10 given from the state recognition mechanism unit 30 is a retrogressive element.

Figure 28:
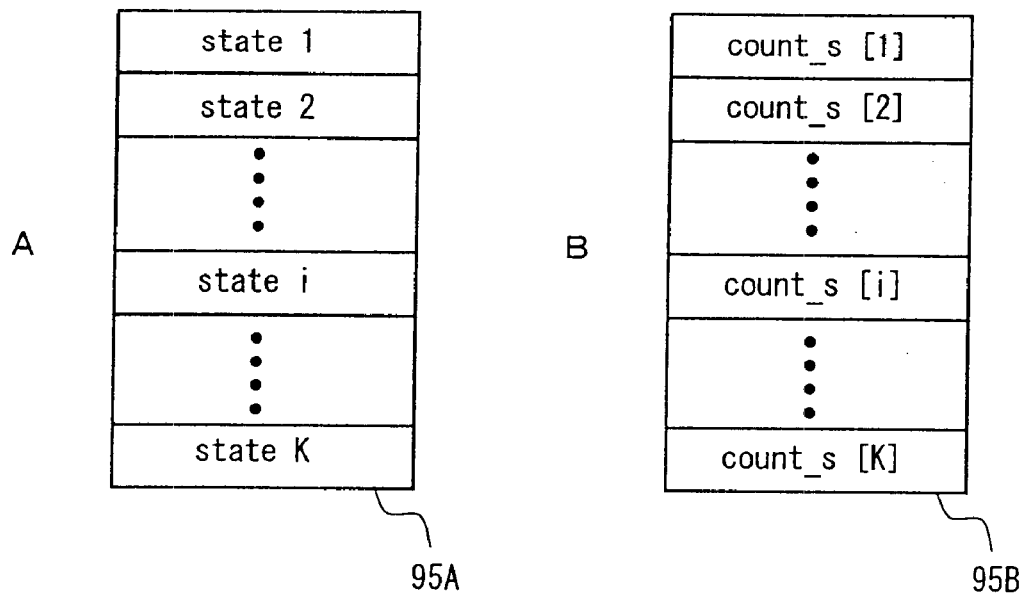
FIGS. 28(A,B) are conceptual diagram of a retrogressive element list and retrogressive element counter table.

If a negative result is obtained at the step SP22, the growth control mechanism unit 92 returns to the step SP21, while, if an affirmative result is obtained, the growth control mechanism unit 92 proceeds to the step SP23 and increases by '1' the corresponding count value in the retrogressive element counter table 95B (FIG. 28B).

The growth control mechanism unit 92 then proceeds to the step SP24 and judges whether or not the count value of the retrogressive element reaches the count value preset as a retrogressive condition, referring to the retrogressive condition and stage number list 96 (FIG. 29).

If a negative result is obtained at this step SP24, the growth control mechanism unit 92 returns to the step SP21, while if an affirmative result is obtained, the growth control mechanism unit 92 proceeds to the step SP25 and determines at random that the behavior and motion model should be transformed to which behavior and motion model in the 'growth stage' of a growth level lower by as many stages as preset for the retrogressive element, the result of which is conveyed to the feeling/instinct modeling unit 31, behavior determining mechanism unit 32 and posture transition mechanism unit 33.

Furthermore, the growth control mechanism unit 92 then proceeds to the step SP26 and resets the retrogressive element counter table 95B such that all the count values in the retrogressive element counter table 95B becomes '0'. Then the growth control mechanism unit 92 proceeds to the step SP27 and terminates the retrogressive processing procedure RT3.

(3-4) Operations and Effects in this Mode of Carrying Out the Invention

Constructed as described in the foregoing, the pet robot 90 grows by stages: from a stage where its behaviors and motions are childish to a stage where its behaviors and motions are adultlike, as if it 'grew' like a real animal as time goes by.

The pet robot 90 transforms its behavior patterns not only in 'growing', depending upon how the user has got along with it and the surroundings it has been put in, and according to the history of its own behaviors and motions, etc., but transforms its behaviors and patterns gradually on other occasions, depending upon how the user gets along with it and the surroundings it has been put in, and according to the history of its own behaviors and motions. Meanwhile, it is also possible that the retrogression of the growth level occurs when the pet robot 90 receives strong shocks, for example.

Accordingly, with the pet robot 90 not only its behaviors patterns can be transformed but its growth level retrograded, depending upon how the user gets along with it and the surroundings it has been put in, and according to the history of its own behaviors and motions, with no regard to 'growing', so that it may retain the user's interest and give him/her a larger sense of affinity and satisfaction.

Constructed as described heretofore, with the pet robot 90 not only its behaviors patterns can be transformed but its growth level retrograded, depending upon how the user gets along with it and the surroundings it has been put in, and according to the history of its own behaviors and motions, with no regard to 'growing', so that it may retain the user's interest and give him/her a larger sense of affinity and satisfaction. Consequently a pet robot may be realized whose amusement quality (entertainingness) is greatly increased.

(3-5) Other Modes of Carrying Out the Present Invention

In the foregoing third mode of carrying out the present invention, elucidation is given on the case wherein the present invention is applied to the four-footed walking pet robot 90. However, the present invention is not limited to it, but may be applied widely to robots in a variety of other configurations. It may also be applied to moving characters, etc. on the monitor screen by means of computer graphics.

In the case of the foregoing third mode of carrying out the present invention, elucidation is given on the case wherein the behavior and/or motion generation means to create behaviors and motions based on the behavior and motion models comprises the controller 10, actuators $21_1$~$21_n$, speaker 20, and the LED placed at the position of an eye, etc. However, the present invention is not limited to it, but may be applicable to a variety of other configurations according to the mode of a robot to which the present invention is applied.

Also, in the case of the foregoing third mode of carrying out the present invention, elucidation is given on the case wherein one and the same controller 90 (growth control mechanism unit 92) comprises the first transforming means to transform a behavior and motion model to behavior and motion models of a higher growth level in succession, and the second transforming means to transform a behavior and motion model to another behavior and motion model of an equal or a lower growth level based on at least one of the input history from the outside and the history of the behavior and motions of its own. However, the present invention is not limited to it, but these transforming means may be formed in separate units.

Furthermore, in the case of the foregoing third mode of carrying out the present invention, elucidation is given on the case wherein the behavior patterns and growth levels are transformed based on both the input history from the outside and the history of behaviors and motions of its own. However, the present invention is not limited to it, but the behavior patterns and growth levels of the pet robot 1 may be transformed by other timings than 'growth' based on either of the input history from the outside or the history of the behaviors and motions of its own, or by the combination of other elements in addition to the input history from the outside or the history of the behaviors and motions of its own. Furthermore, the behavior patterns and growth levels may be transformed based on either the history of its own behaviors or the history of its own motions.

Furthermore, in the case of the foregoing third mode of carrying out the present invention, elucidation is given on the case wherein the pet robot 90 is designed to 'grow' by stages. However, the present invention is not limited to it, but the pet robot 90 may be designed to 'grow' with no stages by detecting the state of growth elements or by gradually varying the control parameter values every time the behavior or motion of the growth element is performed.

Furthermore, in the case of the foregoing third mode of carrying out the present invention, elucidation is given on the case wherein the pet robot 90 is designed to 'grow' or 'retrograde' in four stages: 'Baby', 'Child', 'Young', and 'Adult'. However, the present invention is not limited to it, but the number of 'growth stages' may be set to other numbers than four (4).

Figure 32:
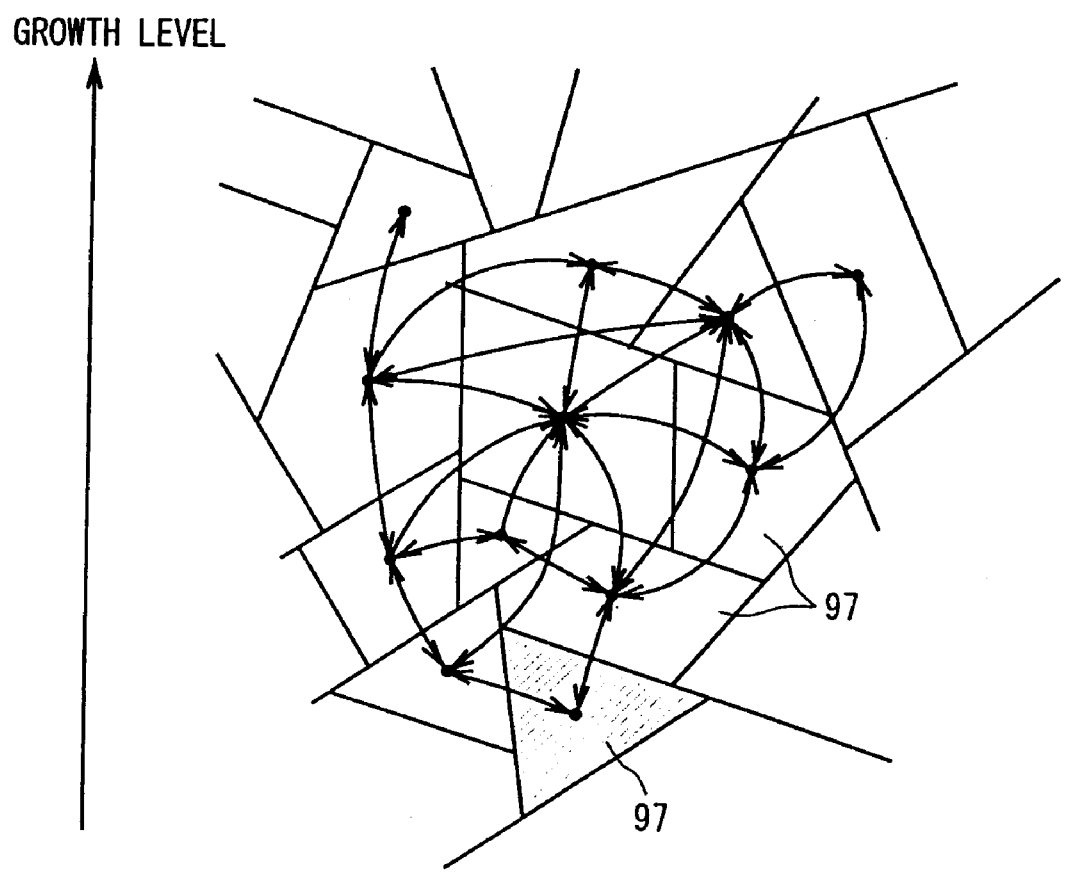
FIG. 32 is a conceptual diagram of other embodiments.

In this case, as with the growth stage model shown in FIG. 32 by way of example, when the transition enable conditions are satisfied at a certain cell 97, 'growth', 'retrogression', and 'the transforming of a behavior pattern' may be carried out in such a way that the pet robot 90 may transits to a cell 97 'equal' to, or 'lower' or 'higher than its own growth level.

Furthermore, in the case of the foregoing third mode of carrying out the present invention, elucidation is given on the case wherein the history of contact inputs through the touch sensor 18, photographs by CCD camera, and command sound inputs using sound commands, etc. are applied as input history from the outside. However, the present invention is not limited to it, but other means in addition to the above, or other means only may be used to make the input history.

Furthermore, in the case of the foregoing third mode of carrying out the present invention, elucidation is given on the case wherein a plurality of behavior and motion models are prepared for each 'growth stage' after 'Child'. However, the present invention is not limited to it, but the only behavior and motion model may be prepared for each 'growth stage'.

Furthermore, in the case of the foregoing third mode of carrying out the present invention, elucidation is given on the case wherein the four (4) items of 'walking state', 'motion', 'behavior', and 'sound' are designated as variables to vary along with 'growing'. However, the present invention is not limited to it, but other items or elements may be used as variables to vary along with 'growing'.

Furthermore, in the case of the foregoing third mode of carrying out the present invention, elucidation is given on the case wherein the behavior patterns of the pet robot 90 are transformed (behavior and motion models are transformed) based on the behavior pattern transform integrated experience value calculated based on the accumulated sum of frequencies of each behavior pattern transforming element. However, the present invention is not limited to it, but the timing to transform the behavior patterns of the pet robot 90 may be determined by other conditions than this.

Similarly in the case of the foregoing third mode of carrying out the present invention, elucidation is given on the case wherein a 'growth stage' is retrograded based on the accumulated sum of frequencies of each retrogressive element. However, the present invention is not limited to it, but the timing to retrograde a 'growth stage' of the pet robot 90 may be determined by other conditions than this.

Furthermore, in the case of the foregoing third mode of carrying out the present invention, elucidation is given on the case wherein transition is allowed only among the behavior and motion models in FIG. 24 connected by the arrow lines in transforming a behavior and motion model within the same 'growth stage'. However, the present invention is not limited to it, but transition may be allowed among the behavior and motion models not connected by the arrow lines.

Furthermore, in the case of the foregoing third mode of carrying out the present invention, elucidation is given on the case wherein the input history from the outside only is used as a retrogressive element. However, the present invention is not limited to it, but it may be also conceivable to use as a retrogressive element, the history of the behaviors and motions of its own in addition to it, or the history of the behaviors and motions of its own only.

(4) Fourth Mode of Carrying Out the Present Invention
(4-1) Structure of a Pet Robot in the Fourth Embodiment In FIG. 1 the '100' is a pet robot in whole in a fourth mode of carrying out the present invention, which is constructed in the same way as the pet robot 1 is in the first mode of carrying out the present invention, except for two points: that it is provided with a plurality of behavior and motion models by which to determine the next behavior for each behavior pattern (Baby 1, Child 1, Child 2, Young 1~Young 3, Adult 1~Adult 4 in FIG. 3) for each 'growth stage', and that it has a function to transform the number of frequencies of appearance of a behavior and motion as physically exerted by the user (This function is referred to as 'learning function' hereinafter).

Figure 33:
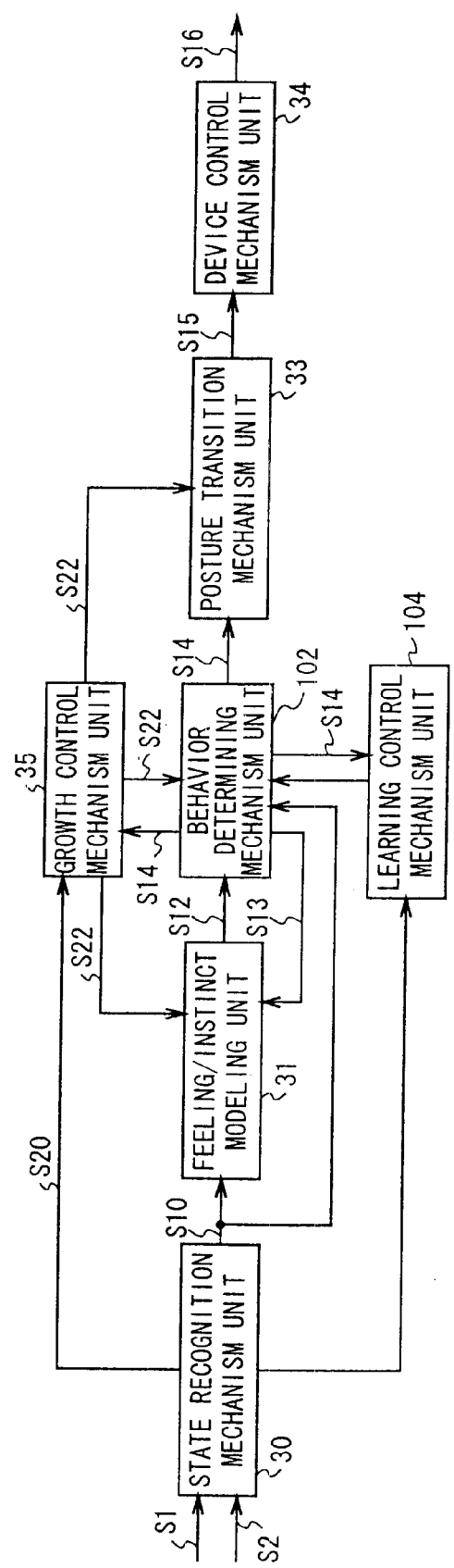
FIG. 33 is a block diagram instrumental in describing the processing of the controller in a fourth embodiment.
Figure 34:
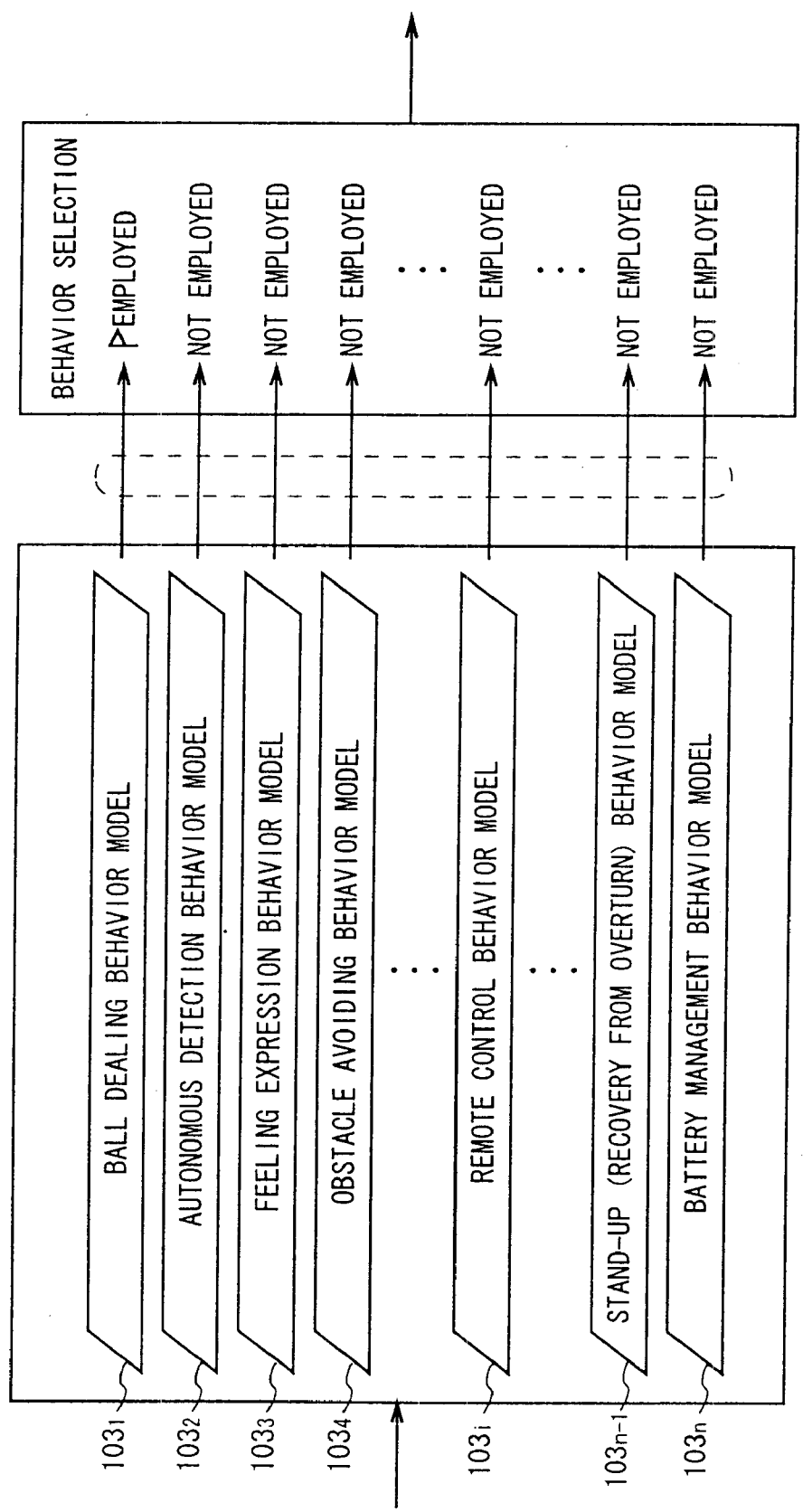
FIG. 34 is a conceptual diagram instrumental in describing a plurality of behavior and motion models provided for each behavior pattern.

This means, in the case of the pet robot 100 the contents a controller 101 (FIG. 2) processes are divided as shown in FIG. 33, wherein the same reference numeral is assigned to the unit corresponding to one in FIG. 4.

The behavior determining mechanism unit 102 of the controller 101 has an individual behavior and motion model $103_1$~$103_n$ for each item of several conditions preselected, such as 'deal with the ball', 'autonomous detection', 'feeling expression', and 'avoid an obstacle', etc. Each individual behavior and motion model $103_1$~$103_n$ is the same as described in FIG. 6 and FIG. 7.

The behavior determining mechanism unit 102 first determines the next behavior using a behavior and motion model corresponding to each behavior pattern on such occasions as when state recognition information S10 is given from the state recognition mechanism unit 30, or when a given period of time has elapsed since the last behavior appeared, and then selects a behavior from among the determined behaviors, using a behavior and model $103_1$~$103_n$ with a high priority in predetermined order according to the then recognition results, etc. obtained by means of the state recognition mechanism unit 30, which (the selected behavior) is conveyed as behavior determining information S14 to the feeling/instinct modeling unit 31, posture transition mechanism unit 33, and learning control mechanism unit 104 respectively.

In this manner the pet robot 100 is designed to be capable of embodying a variety of behaviors and motions from the same input by using a plurality of behavior and motion models $103_1$~$103_n$ for each behavior pattern.

Meantime, the state recognition mechanism unit 30 recognizes events 'stroked' or 'patted' based on the pressure detection signal S1C (FIG. 2) given from the touch sensor 18, the result of which is conveyed to the learning control mechanism unit 104.

At this time the learning control mechanism unit 104 knows the present and past behaviors of the pet robot 100 based on the behavior determining information S14 given from the behavior determining mechanism 102. Then, given the recognition result from the state recognition mechanism unit 30 that the pet robot 100 has been 'stroked' while embodying behaviors, the learning control mechanism unit 104 conveys this result to the behavior determining mechanism 102.

Thus, based on this notification the behavior determining mechanism 102 increases by the predetermined value the transition probability corresponding to the behavior or motion then outputted, which is on the state transition table 50 (FIG. 7) of the node $ND_{A0} \sim ND_{An}$ (FIG. 6) selected just before it for each behavior and motion model $103_1 \sim 103_n$ of the corresponding behavior pattern, while decreases by the predetermined value the other transition probabilities on the same line in response to the former, so that the total sum becomes 100 [%].

Meanwhile, given the recognition result that the pet robot has been 'stroked' while embodying a behavior from the state recognition mechanism unit 30, the learning control mechanism unit 104 conveys this result to the behavior determining mechanism 102.

Thus, based on this notification the behavior determining mechanism 102 increases by the predetermined value the transition probability corresponding to the behavior or motion then outputted, which is on the state transition table 50 (FIG. 7) of the node $ND_{A0} \sim ND_{An}$ (FIG. 6) selected just before it for each behavior and motion model $103_1 \sim 103_n$ of the corresponding behavior pattern, while decreases by the predetermined value the other transition probabilities on the same line in response to the former, so that the total sum becomes 100 [%].

Controlled as described in the foregoing, with an action 'stroked' exerted the transition probability corresponding to that action increases, thereby making it easier for the pet robot 100 to embody that action, and with an action 'patted' exerted the transition probability corresponding to that action decreases, thereby making it harder for the pet robot 100 to embody that action. In this way it is possible to have the pet robot 100 transform its behaviors as if it could behave like a real animal as a result of learning the disciplines by the keeper.

Consequently the pet robot 100 is capable of transforming its behaviors and motions by achieving learning as physically exerted by the user.

Furthermore, in the case where the pet robot 100 thus constructed learns in accordance with physical inputs from a user, each behavior pattern (Baby 1, Child 1, Child 2, Young 1—Young 3, Adult 1—Adult 4) has a different learning speed and further, each behavior and motion model $103_1 \sim 103_n$ of each behavior pattern has a different learning speed. For example, the language ability may be in the Baby stage but the movement ability may be in the Young stage.

It means that the behavior determining mechanism 102 comprises in a memory 101A (FIG. 2) a table regulating the learning speed for each of the behavior and motion models $103_1 \sim 103_n$ (referred to as 'learning speed table' hereinafter).

If the notification is given from the learning control mechanism unit 104 that the pet robot 100 has been 'stroked' while embodying a behavior, the behavior determining mechanism 102 increases by as much value as specified by the learning speed table 105 the transition probability corresponding to the then outputted behavior or motion on the state transition table 50 (FIG. 7) of the corresponding node $ND_{A0} \sim ND_{An}$ (FIG. 6) in respect to each behavior and motion models $103_1 \sim 103_n$ of the corresponding behavior pattern, while decreases the values of the other transition probabilities on the same line in response to the former.

For example, if the then behavior pattern is a 'normal' behavior pattern (Young 2) for 'Young', the behavior determining mechanism unit 102 increases by '5' only the corresponding transition probability on the state transition table 50 of the corresponding node $ND_{A0} \sim ND_{An}$ in respect to the behavior and motion model $103_1$ for 'deal with the ball', by '2' only the corresponding transition probability on the state transition table 50 of the corresponding node $ND_{A0} \sim ND_{An}$ in respect to the behavior and motion model $103_2$ for 'autonomous detection', and by '1' only the corresponding transition probability on the state transition table 50 of the corresponding node $ND_{A0} \sim ND_{An}$ in respect to the behavior and motion model $103_3$ for 'battery management'.

Whereas, if the notification is given from the learning control mechanism unit 104 that the pet robot 100 has been 'patted' while embodying a behavior, the behavior determining mechanism unit 102 decreases by as much value as specified by the learning speed table 105 the transition probability corresponding to the then output behavior or motion on the state transition table 50 (FIG. 7) of the corresponding node $ND_{A0} \sim ND_{An}$ (FIG. 6) in respect to each behavior and motion model $103_1 \sim 103_n$ of the corresponding behavior pattern while increases the values of the other transition probabilities on the same line in response to the former.

For example, if the then behavior pattern is a 'aggressive' behavior pattern (Adult 1) for 'Adult', the behavior determining mechanism unit 102 decreases by '2' only the corresponding transition probability on the state transition table 50 of the corresponding node $ND_{A0} \sim ND_{An}$ in respect to the behavior and motion model $103_1$ for 'deal with the ball', by '6' only the corresponding transition probability on the state transition table 50 of the corresponding node $ND_{A0} \sim ND_{An}$ in respect to the behavior and motion model $103_2$ for 'autonomous detection', and by '0' (no transforming in the transition probability in this case) the corresponding transition probability on the state transition table 50 of the corresponding node $ND_{A0} \sim ND_{An}$ in respect to the behavior and motion model $103_n$ for 'battery management'.

As described heretofore, with the pet robot 100 the corresponding transition probability on the state transition table 50 of the corresponding $ND_{A0} \sim ND_{An}$ is varied, in response to the physical influence from the user, by changing the speed of learning of each behavior pattern as well as behavior and motion model $103_1 \sim 103_n$, in particular, of each behavior pattern.

(4-2) Operations and Effects in this Embodiment

Configured as described heretofore, with the pet robot 100 the speed of learning is varied for each behavior and motion model $103_1 \sim 103_n$ according to behavior patterns (Baby 1, Child 1, Child 2, Young 1~Young 3, Adult 1~Adult 4).

Accordingly the pet robot 100 is capable of representing a variety of individualities by combining 'growth' and 'learning'.

Thanks to such a configuration, a variety of individualities may be represented in combination of 'growth' and 'learning' by incorporating the learning function into the pet robot 100, preparing a plurality of behavior and motion models $103_1 \sim 103_n$ for each behavior pattern, and varying the speed of learning for each of behavior and motion models $103_1$~$103_n$ according to a behavior pattern. Thus a pet robot can be realized that may offer a greatly enhanced quality of amusement.

(4-3) Other Modes of Carrying Out the Present Invention

In the foregoing fourth embodiment, elucidation is given on the case wherein the present invention is applied to four-footed walking pet robots as illustrated in FIG. 1. However, the present invention is not limited to it, but may be applied widely to a variety of other robots capable of 'giving' and 'receiving'.

Also, in the foregoing fourth embodiment, elucidation is given on the case wherein a plurality of behavior and motion models $103_1$~$103_n$ are prepared for each behavior pattern and a different speed of learning is set for each of the behavior and motion models $103_1$~$103_n$. However, the present invention is not limited to it, but a different speed of learning may be set for each behavior pattern even in the case that the only behavior and motion model is prepared for each behavior pattern as in the case of the first embodiment for example.

Furthermore, in the foregoing embodiment, elucidation is given on the case wherein the speed of learning may be varied for each of the behavior and motion models $103_1$~$103_n$. However, the present invention is not limited to it, but items to learn may be varied for each of the behavior and motion models $103_1$~$103_n$, so that the number of frequencies of an embodiment varies by learning an item (event) 'kick the ball' for example, in a certain behavior and motion model $103_1$~$103_n$ (that is, the transition probability increases or decreases) but that it does not vary in the other behavior and motion model $103_1$~$103_n$.

Furthermore, in the foregoing embodiment, elucidation is given on the case wherein the frequency of embodiment of a certain behavior is varied by means of learning. However, the present invention is not limited to it, but a learning function may be provided for a certain behavior and motion, for example, that varies control parameters so that a behavior or motion is conducted in a much better way thanks to the learning acquired by the physical influence from the user. (Example: a learning function capable of interchanging several sets of control parameters prepared for an event 'walking' for example so that the parameters applied to a 'poor way of walking' may be changed to those of a 'better way of walking' by the influence from the user, such as 'stroke' or 'pat', and vice versa.)

INDUSTRIAL APPLICABILITY

The present invention may be applied to entertaining robots such as pet robots.

What is claimed is:

1. A robot, for learning predetermined functions, comprising:

behavior and/or motion generating means for generating behavior and/or motion functions based on behavior and/or motion models, each behavior and/or motion model being associated with one of a plurality of growth level stages; and behavior and/or motion model transforming means for transforming said behavior and/or motion models into behavior and/or motion models of a higher growth level at a given timing selectively based on an input history supplied from outside the robot or the history of the robot's evaluation of the robot's own behaviors and/or motions, wherein said robot learns said functions at a predetermined learning speed in accordance with said growth level stages.

2. The robot of claim 1, wherein said predetermined functions include a language function or a moving function.

3. A robot comprising:

a growth element detector detecting a growth element supplied from outside the robot or from within the robot;

a memory for storing a plurality of behavior and/or motion models, each behavior and/or motion model being associated with one of at least three growth stages;

a growth stage transformer for transforming a current growth stage of the robot based on said detected growth element; and a controller for controlling said robot based on said behavior and/or motion model in accordance with the current growth stage that was transformed.

4. The robot of claim 3, wherein said growth stages are classified according to a directory tree.

5. The robot of claim 3, wherein said growth stages include at least three stages selected from the group consisting of a tweety stage, a baby stage, a child stage, a young stage and an adult stage.

6. The robot of claim 3, wherein said growth stage transformer transforms said growth stage from a current growth stage to a higher growth stage or to a lower growth stage.

* * * * *